US012809175B2

(12) United States Patent
Hirano et al.

(10) Patent No.: US 12,809,175 B2
(45) Date of Patent: Nov. 24, 2026

(54) AMBIENT LIGHT MANAGEMENT FOR A TRANSPARENT DISPLAY

(71) Applicant: Google LLC, Mountain View, CA (US)

(72) Inventors: Natalie Sonsogno Hirano, Waterloo (CA); Alexandra Elizabeth Boehm, San Jose, CA (US)

(73) Assignee: Google LLC, Mountain View, CA (US)

( * ) Notice: Subject to any disclaimer, the term of this patent is extended or adjusted under 35 U.S.C. 154(b) by 249 days.

(21) Appl. No.: 18/651,111

(22) Filed: Apr. 30, 2024

(65) Prior Publication Data

US 2025/0334805 A1 Oct. 30, 2025

(51) Int. Cl.

*G02B 27/01* (2006.01)
*G02F 1/165* (2019.01)

(52) U.S. Cl.

CPC ......... *G02B 27/0172* (2013.01); *G02F 1/165* (2019.01); *G02B 2027/0118* (2013.01); *G02B 2027/014* (2013.01); *G02B 2027/0178* (2013.01)

(58) Field of Classification Search

CPC ........ G02B 27/0172; G02B 2027/0118; G02B 2027/014; G02B 2027/0178; G02F 1/165; G02F 1/15; G02F 1/154; G02F 1/163
See application file for complete search history.

(56) References Cited

U.S. PATENT DOCUMENTS

| | | | | |
|---|---|---|---|---|
| 8,174,489 | B2 * | 5/2012 | Sorensson | G06F 1/1684 345/105 |
| 2019/0324274 | A1 * | 10/2019 | Kalinowski | G02F 1/0126 |
| 2022/0398986 | A1 | 12/2022 | Dewall et al. | |

FOREIGN PATENT DOCUMENTS

| | | | |
|---|---|---|---|
| WO | 2023096713 | A1 | 6/2023 |
| WO | 2023107272 | A2 | 6/2023 |

* cited by examiner

*Primary Examiner* — Nathanael R Briggs
(74) *Attorney, Agent, or Firm* — Brake Hughes Bellermann LLP

(57) ABSTRACT

Systems and methods for ambient light management for a transparent display are described herein. For example, an illustrative display system may comprise an ambient light sensor configured to detect a first spectral power distribution associated with ambient light. The display system may further comprise a transparent display including a display panel and an optical stack. The display panel may be associated with a second spectral power distribution and may be configured to generate display light. The optical stack may be configured to present the display light while allowing passthrough of a portion of the ambient light. The optical stack may include a configurable color filter that filters the portion of the ambient light to change the first spectral power distribution based on the second spectral power distribution. Corresponding devices and processes are also disclosed.

20 Claims, 10 Drawing Sheets

AMBIENT LIGHT MANAGEMENT FOR A TRANSPARENT DISPLAY

BACKGROUND

Transparent displays (also known as see-through displays and by other names) are display screens configured to allows users to see the real world directly (i.e., by light from the real-world environment passing through the display screen itself) while additional content is integrated with and/or displayed on top of the visible real-world content. Some transparent displays may not be configured to operate in a desirable fashion in some real-world applications.

SUMMARY

The human brain interprets color in a complex manner that accounts for various cues including not only absolute frequencies of light reflected by various objects but also a sense of the average frequency of ambient light in the environment. Accordingly, it can be challenging for a transparent display to accurately color display content as the brain expects the content to look in the present environment. While attempts have been made to color display content itself to conform to ambient light in the environment, this type of approach can be computationally intensive (and suffer from other challenges) as every color must be recalculated given the characteristics of a particular ambient lighting scenario. Implementations described herein for ambient light management for a transparent display therefore take a different approach. Rather than adapting the display content to resemble or try to match the real-world content, implementations described herein utilize configurable color filters (e.g., programmable tints) built into the optical stack (e.g., lens stack) of a transparent display to instead adapt ambient light from the scene to resemble the overlaid display content. In this way, the display panel may be configured to color content based on aesthetic and technical considerations (e.g., optimizing for efficiency, brightness, etc.) without dynamically adapting the display content to account for how the environment happens to be illuminated. At the same time, the user still experiences the real world, through the configurable filter or tint, as being compatible (e.g., effectively color matched) with the display content being presented.

To this end, one implementation described herein involves a display system that includes at least an ambient light sensor and a transparent display with a display panel and an optical stack. The ambient light sensor may be configured to detect a first spectral power distribution associated with ambient light. For example, as will be described in more detail below, the first spectral power distribution may define the chromaticity of ambient light illuminating a scene where the display system is located. The display panel of the transparent display may be configured to generate display light and may be associated with a second spectral power distribution. For example, as will be described in more detail below, the second spectral power distribution may define the chromaticity of the display light that the display is configured to produce. The optical stack of the transparent display (e.g., a lens stack of a head-mounted device such as an augmented reality glasses device) may be configured to present the display light while allowing passthrough of a portion of the ambient light. Moreover, the optical stack may include a configurable color filter that filters the portion of the ambient light to change the first spectral power distribution based on the second spectral power distribution. For example, the first spectral power distribution of the portion of the ambient light may be dynamically transformed by the color filter to resemble or try to match with the second spectral power distribution of the display panel.

Another example implementation described herein involves a method that may be performed by a display system (and components thereof) such as the display system described above. For example, the method may include: 1) detecting a first spectral power distribution associated with ambient light of a scene in which a transparent display is located, the transparent display including a display panel associated with a second spectral power distribution and an optical stack that allows passthrough of a portion of the ambient light; 2) generating, by the display panel, display light for presentation by the optical stack while allowing the passthrough of the portion of the ambient light; and 3) filtering, by a configurable color filter included within the optical stack, the portion of the ambient light passing through the optical stack to change the first spectral power distribution of the portion of the ambient light based on the second spectral power distribution of the display panel.

Yet another example implementation described herein involves a non-transitory computer-readable medium storing instructions that, when executed, cause a processor of a transparent display to perform a process. For example, the process may include: 1) receiving, from an ambient light sensor, data indicating a first spectral power distribution associated with ambient light of a scene in which the transparent display is located, the transparent display including a display panel associated with a second spectral power distribution and an optical stack that allows passthrough of a portion of the ambient light; 2) causing the display panel to generate display light for presentation by the optical stack while allowing the passthrough of the portion of the ambient light; and 3) generating, based on the data indicating the first spectral power distribution and data indicating the second spectral power distribution, an electrical signal configured to cause a configurable color filter included within the optical stack to filter the portion of the ambient light passing through the optical stack.

Various additional operations may be added to these processes and methods as may serve a particular implementation, examples of which will be described in more detail below. Additionally, it will be understood that each of elements described as being part of certain types of implementations in the examples above (e.g., display system components, method steps, process operations, etc.) may additionally or alternatively be included or performed by other types of implementations as well. For example, a process described above as being included in a computer-readable medium could be performed as a method or could be performed by at least one processor of a display system such as described herein. Similarly, the method set forth above could be encoded in instructions stored by a computer-readable medium or could be executed by a display system such as described above.

The details of these and other implementations are set forth in the accompanying drawings and the description below. Other features will also be made apparent from the following description, drawings, and claims.

DETAILED DESCRIPTION

Figure 1:
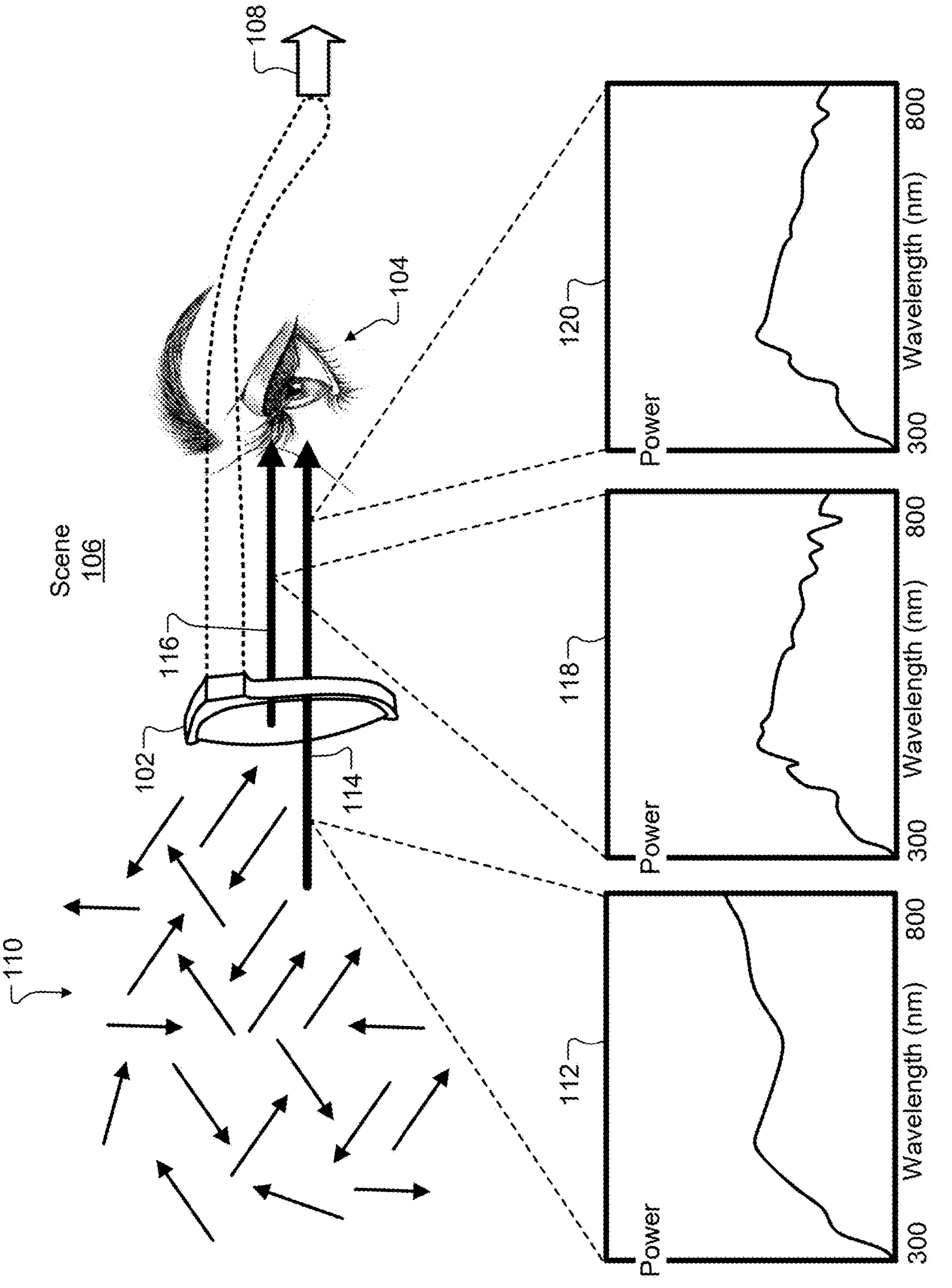
FIG. 1 shows certain ambient light management aspects for one illustrative implementation of a transparent display in accordance with principles described herein.

Color perception is an important part of human vision, and, as such most electronic devices configured to present content to users (e.g., by way of display screens, etc.) do so in color. However, for a screen presenting content using potentially millions of different colors that the screen is capable of reproducing, accurate and aesthetically pleasing color presentation can present various technical challenges. To add to these challenges, the human brain interprets color in a complex manner that accounts for various cues including not only raw color (i.e., the frequencies of light reflected by various objects) but also what the brain senses to be the average frequency of light in the environment. For example, a person may interpret an object of a particular shade (e.g., a red ball) as being the same color (e.g., the particular shade of red) in various lighting scenarios such as in broad daylight, at sunset, under indoor incandescent lighting, under fluorescent lights, and so forth, even though the frequencies of light reflected from the object and received by the eyes of the user may be quite different in these different scenarios. In other words, a red ball may be correctly interpreted as red in various scenes with various different lighting conditions, even though the frequencies of light actually reflected by the ball are different in each scene based on the ambient light characteristics of the scene.

Related to color interpretation, human color adaptation is a dynamic process that depends on the spectral characteristics of ambient lighting. For example, the spectral characteristics of light that reflect off of an object may depend on the illuminant spectra (e.g., the spectral power distribution of the ambient light), which, as mentioned above, may change depending on the time of day (e.g., for outdoor environments) and/or based on lighting characteristics (e.g., for indoor environments). This means that objects (e.g., the red ball example above) may have two very different spectral reflectances, or chromaticities, under different ambient lighting scenarios, but may be perceived as the same color because the brain infers the spectral characteristics of the environment and discounts the illuminant of the ambient light when inferring color appearance. Since the spectral characteristics of real-world content are dynamic and typically unknown, a technical problem arises for display screens that seek to present content (e.g., augmented reality objects, etc.) with color that is to be perceived as corresponding to real-world content (e.g., matching or resembling the perceived color of a real-world object). For example, if display content (e.g., an augmented reality object, etc.) is intended to appear as a specific color or to use a particular color palette (e.g., for a brand logo of a particular color, for a user interface employing particular colors, for virtual objects that are to be seamlessly blended with real-world objects in augmented reality scenarios, etc.), the color of such objects may not be perceived as intended if the ambient lighting does not resemble what is assumed by the color space of the display.

Additionally, while these types of effects and phenomena may be desirable to account for with traditional devices that capture light (e.g., cameras) and/or that reproduce imagery captured from a particular scene (e.g., smartphone display screens, television screens, etc.), emerging transparent displays may be even more susceptible to the technical problems described above. As will be described in more detail below, transparent displays (also known by other names such as see-through displays) combine ambient light that passes through the display screen with display light that is generated by a display panel (e.g., a pixel panel) so as to reflect off the display screen or to otherwise be presented thereon (e.g., by way of waveguides, gratings, optical combiners, and/or other suitable optical elements). As one example, a transparent display implemented by a pair of augmented reality glasses may overlay virtual content (e.g., virtual objects, text, or other augmentations) onto the environment seen by the user through the glasses. As another example, a transparent display integrated with a car windshield could display navigation instructions or other dashboard-type information (e.g., a current speed, etc.) without blocking a driver's view of the road. Whether used for augmented reality, mixed reality, or other suitable applications, a user of a transparent display may see a combination or blend of both a physical world and a virtual world as ambient light (from the environment) is combined with display light (from a display panel) in an integrated presentation.

Accordingly, another technical problem faced by transparent displays, in particular, relates to the color gamut volume (e.g., in CIE chromaticity space) representing chromaticities achieved by the transparent displays. These chromaticities may depend heavily on the spectral characteristics of the ambient light environment since the display light is combined or added to the ambient light and, therefore, the light at the cornea is a mixture of the display light and background (ambient) light. This mixing of light can make it difficult to accurately control the chromaticities of overlaid content (e.g., augmented reality objects), particularly at relatively low contrast ratios where the contribution from the ambient light is relatively large in comparison to the display light.

Since the ambient light and its various characteristics (e.g., chromaticity, etc.) is generally outside the control of a transparent display system, conventional approaches to technical problems described above involve changes to the display light (which is within the control of the display system) that is being combined with the ambient light in the transparent display. However, these approaches may themselves be associated with various limitations. For example, it may be computationally intensive and inefficient to continually compute the color presented by the display light as a function of the ambient light it will be mixed with.

Moreover, changing the display light to accommodate the ambient light may compress the perceived color gamut, since display chromaticities are pulled toward the background chromaticity as the contribution of the background environment to the color mixture increases at lower contrast ratios.

Methods and systems described herein for ambient light management for transparent displays provide a technical solution to address all of these technical problems. Specifically, rather than expending the significant computational resources to adjust the display light to resemble (e.g., conform to, match, etc.) the ambient light from the environment, ambient light management implementations described herein use dynamic tinting and filtering on the transparent display to adjust the ambient light to conform to the display light. Research investigating tinted lenses and changes in human color perception (e.g., due to normal age-related brunescence of the eye's lens, etc.) provides evidence that colors in the real world are perceived normally after a short period of adaptation to the filtering or tint. Accordingly, there is not a negative impact on user perception of real-world colors, particularly when the dynamic tinting serves to match the ambient light with display light from panels that are spectrally tuned to natural, real-world illuminants (e.g. average daylight illuminants, etc.).

This technical solution of filtering the ambient light to bring it into conformance with the display light (rather than, or in addition to, actively adjusting the display light to better conform to or match with the ambient light) does, however, produce significant technical effects beneficial to the system. For example, the considerable amount of computation needed to base display light chromaticity on detected ambient light may be eliminated or at least significantly reduced. Additionally, the color gamut used by the display screen may include a range of colors that is determined based on design considerations of the display panel itself, rather than being dependent on (and possibly compressed by) ambient light characteristics that are outside the scope of the display panel design. For example, if a particular technology used in a display panel shows one color more efficiently than another, this efficiency may be taken full advantage of without ambient light considerations forcing the display panel to operate with a less efficient color gamut. Finally, a technical effect that may be most notable to the user of the transparent display system is that the resemblance of the ambient light and the display light by the spectral-filter-based ambient light management described herein may efficiently produce consistent, accurate, and vibrant colors in all types of environments and ambient light conditions.

Various implementations will now be described in more detail with reference to the figures. It will be understood that particular implementations described below are provided as non-limiting examples and may be applied in various situations. Additionally, it will be understood that other implementations not explicitly described herein may also fall within the scope of the claims set forth below. Systems and methods described herein for ambient light management for a transparent display may result in any or all of the technical effects mentioned above, as well as various additional effects and benefits that will be described and/or made apparent below.

FIG. 1 shows certain ambient light management aspects for one illustrative implementation of a transparent display in accordance with principles described herein. More specifically, as shown, FIG. 1 shows a transparent display that is incorporated within an augmented reality glasses device 102 that is worn by a user 104 within a scene 106. For illustrative convenience, augmented reality glasses device 102 is shown in a side view where a left-side temple is drawn with a dotted line and the glasses are offset from user 104 in a manner that allows a clearer illustration of the types of light being transmitted between the glasses and the left eye of user 104. An arrow 108 at the temple tip indicates that user 104 may normally wear augmented reality glasses device 102 in the normal manner by sliding the glasses to the right so that the bridge rests on the nose and the lenses are immediately in front of the eyes of user 104.

While the transparent display in the example of FIG. 1 is incorporated into augmented reality glasses device 102, it will be understood that similar principles may apply to transparent displays implemented in other ways (e.g., incorporated into other types of devices, etc.). For example, a transparent display could be integrated with a windshield or other type of window (e.g., a car windshield, a smart window in a building or airplane, etc.), integrated with another type of extended reality device, or implemented in other suitable ways.

Ambient light 110 at scene 106 is depicted in FIG. 1 by a group of arrows pointing in various directions in front of augmented reality glasses device 102. These arrows represent various light waves at various frequencies that are being generated and/or reflecting off of objects at scene 106. For example, if scene 106 is an outdoor scene, ambient light 110 may represent sunlight that travels through Earth's atmosphere and eventually reaches the eyes of user 104 after reflecting off one or more objects. As another example, if scene 106 is an indoor scene, ambient light 110 may represent light produced by an artificial light source (e.g., a light bulb or other light source in the room) that reaches the eyes of user 104 directly and/or after reflecting from objects in the room.

Various characteristics of ambient light 110 may be dependent on the light source, the objects from which the light reflects, the time of day, the atmosphere through which the light travels, and various other factors. As a result, for example, ambient light 110 may have certain characteristics if scene 106 is outside at midday with clear skies, other characteristics if scene 106 is outside at sunset with cloudy skies, other characteristics if scene 106 is inside a room illuminated by bright fluorescent lights, and still other characteristics if scene 106 is inside a room illuminated by a fire or candlelight. In all of these and many other examples, the ambient light 110 at the scene may be characterized not only based on how bright the light is, but also based on the average frequency and/or the prominence of various colors within the light. For example, the example outdoor scene at midday mentioned above may include one distribution of light frequencies across the spectrum that differs from the distribution that might be found outdoors at sunset (e.g., where there may be less blue and green components of the ambient light and more red components).

One way of characterizing ambient light 110 (or light from other sources, such as display light from a display panel, as will be described in more detail below) is with reference to its spectral power distribution. As used herein, a spectral power distribution associated with a particular light source is a representation of the distribution of spectral power across various frequencies of visible light. For example, the spectral power distribution may be represented by a graph or mathematical function that describes the power emitted by a light source (or reflected by an object) at different wavelengths of the electromagnetic spectrum to shows the distribution of energy across the visible (and potentially invisible) wavelengths of light. Such representations may take various forms, including, for instance, graphs such as those shown herein, one or more coordinates within a chromaticity space (e.g., CIE chromaticity space, etc.), or the like.

To illustrate, for example, a spectral power distribution 112 of ambient light 110 (and, more particularly, of a portion 114 of the ambient light 110 that passes through the lenses of augmented reality glasses device 102) is shown in FIG. 1. As shown, spectral power distribution 112 is a graph that shows a distribution of visible wavelengths of light from 300 nm to 800 nm along the x-axis and the respective power or prominence of these wavelengths within the ambient light along the y-axis. As such, spectral power distribution 112 shows that ambient light 110 has little light at very high frequencies (e.g., blue shades with short wavelengths around 300 nm), a peak in mid-frequencies (e.g., green shades with wavelengths around 450 nm), and the largest distribution at lower frequencies (e.g., red shades with long wavelengths around 800 nm).

The overall color quality of lighting represented by its spectral power distribution may be referred to as the chromaticity of the lighting. As such, for example, the chromaticity of ambient light 110, and, more particularly, the chromaticity of the portion 114 of ambient light 110 passing through the transparent display of augmented reality glasses device 102, will be understood to be indicated or characterized by the spectral power distribution 112 graph. The chromaticity of light received by user 104 may influence the user's perception of color, such as by making color on the transparent display appear slightly cooler if the chromaticity has a blue cast, making the color appear warmer if the chromaticity has a red cast, making the color appear to the user to have more or less saturation than desired (depending on the relative chromaticities and weighting of ambient and display light), and so forth.

While the spectral power distribution of a particular light source may represent a fundamental measurement of the light's actual energy distribution across the color spectrum, it is also useful to refer to standardized and/or otherwise predefined spectral power distributions associated with particular lighting conditions. Such standardized reference points are referred to herein as illuminants. As used herein, an illuminant refers to a light source (e.g., a real or theoretical light source) with a defined spectral power distribution that serves as a reference point for other light sources (e.g., real-world light sources such as ambient light 110 or a display panel producing display light). Standard illuminants have been defined to represent common lighting conditions such as average daylight (e.g., a 'D' illuminant such as D65), incandescent lighting (e.g., an 'A' illuminant), fluorescent lighting (e.g., an 'F' illuminant), and so forth.

Just as ambient light 110 at a particular scene 106 may have its own chromaticity (which may or may not align closely with a standard illuminant), other light sources such as a display panel for a transparent display may, too, generate light with a particular chromaticity that may or may not align closely with a standard illuminant. For example, a computer monitor might have a spectral power distribution that deviates from a standard illuminant like D65, which may lead the monitor to produce colors appearing slightly different on the screen compared to how they would appear when printed or viewed in daylight.

As has been mentioned, transparent displays may be configured to track and account for chromaticities of both ambient light and display light because both of these may significantly influence the color ultimately perceived by a view of the transparent display. For example, the brain of a viewer may estimate the color of an object based not only on the spectral power distribution of light reflected from that object but also based on the brain's estimation of the spectral power distribution of light in the environment. If the environment includes an overabundance of warm red tones, such as in a sunset scene, the brain may automatically tend to subtract or discount some amount of red from the color reflected from a particular object (and actually perceived by the eye) to more closely estimate the object's actual color. As a result, an example object such as a white sheet of paper would be perceived as being white even though, when viewed in a sunset environment with lots of reds, the light reflecting from the paper may include much more power in red portions of the spectrum than in blue and green portions of the spectrum.

A white point of a particular ambient light scenario or display screen may be another suitable way to characterize or describe the chromaticity of interest. For example, while a spectral power distribution graph that shows the higher power in the red portions of the spectrum may be one way to characterize the chromaticity of the sunset environment in the example above, another way could be to specify coordinates of a white point of the environment within a standard chromaticity space (e.g., the CIE 1931 color space model, etc.). The white point for a standard illuminant such as D65 may be found at one set of coordinates, for example, while the white point for the particular ambient lighting of a scene may be offset from that set of coordinates as a result of the different spectral power distribution. The spectral power distribution may therefore be represented using a graph or function representing the spectral power distribution itself, coordinates for the white point, the offset of the white point from coordinates of a known standard or default (e.g., a white point of D65 or another standard illuminant, etc.), or in any other suitable way.

The portion 114 of the ambient light 110 passing through augmented reality glasses device 102 is shown to reach the eye of user 104 together with some amount of display light 116 from a display panel included in the transparent display. While FIG. 1 shows display light 116 originating from an optical stack of augmented reality glasses device 102 (also referred to as a lens stack for glasses devices), it will be understood and described in more detail below that display light 116 may actually originate from a display panel (not shown in FIG. 1) whose light is projected to reflect from a lens or is otherwise transmitted (e.g., by one or more waveguides or other suitable optical devices) so as to be combined with portion 114 of ambient light 110.

The display panel generating display light 116 may be associated with a spectral power distribution that is different from spectral power distribution 112 of ambient light 110. Specifically, as shown, display light 116 be associated with a spectral power distribution 118 to which the display panel is tuned. For example, in this case, spectral power distribution 118 shows a spectral power distribution for a D65 illuminant that the display panel may have been explicitly designed to implement (e.g., as a consequence of red, green, and blue primary spectral distributions selected as part of the design of the display panel, which together cause the display to have the D65 white point).

If the mismatch between the spectral power distribution 112 of portion 114 of ambient light 110 and the spectral power distribution 118 is not addressed in some way, the color presented to and perceived by user 104 may be inaccurate (as described above). Accordingly, as has been mentioned, augmented reality glasses device 102 may include (e.g., as a layer within the lens stack, not explicitly shown in this figure) a configurable color filter that filters portion 114 of ambient light 110 to change spectral power distribution 112 based on spectral power distribution 118. Specifically, as illustrated by a spectral power distribution 120, this configurable color filter may filter the portion 114 of ambient light 110 (after the light passes through the lens stack and before it reaches the eye of user 104) such that its chromaticity (i.e., shown by spectral power distribution 120) resembles the chromaticity of the display panel and the display light 116 (i.e., shown by spectral power distribution 118).

As shown, this resemblance may not be a perfect one (e.g., due to various real-world design considerations of physical filter mechanisms). However, whereas spectral power distribution 112 is shown to diverge significantly from spectral power distribution 118 (e.g., in shape, in magnitude, etc.), the spectral power distribution 120 resulting from the filtering of portion 114 is shown to closely follow or mimic the desired spectral power distribution 118 of the display panel. This may be achieved by dynamic, spectral tinting of the portion 114 based on detected characteristics of ambient light 110, as will be described and illustrated in more detail below. More particularly, as opposed to gray tints of common sunglasses that filter light relatively uniformly across the spectrum, the configurable color filter used to produce spectral power distribution 120 based on spectral power distribution 118 may reduce the ambient power on a spectral, frequency-by-frequency basis such that the ambient white point becomes identical to, or at least a close approximation of, the display's white point.

In some implementations, the filtering of the ambient light to change spectral power distribution 112 of ambient light 110 based on spectral power distribution 118 of the display panel may be performed in combination with changes to display light 116 configured to bring spectral power distribution 118 closer to spectral power distribution 112. As mentioned above, for example, such changes to the display light may be a more conventional way of addressing the mismatch of spectral power distribution 112 and spectral power distribution 118. In other examples, however, the transparent display may be configured to cause the configurable color filter to change spectral power distribution 112 of portion 114 of the ambient light 110 without causing the display panel to change spectral power distribution 118 of the display panel. As mentioned above, various disadvantages and costs may accompany an adaptation of display light to make spectral power distribution 118 conform more closely with spectral power distribution 112. For example, techniques for updating display color spaces to the real world often may not be able to achieve the accuracy that is required for an immersive augmented reality display (e.g., such as augmented reality glasses device 102) and may therefore rely on color models that are tuned to standard observers and do not reflect individual variability. As another example mentioned above, techniques for altering the display light 116 may be computationally expensive and may be undesirable in situations where color bit depth and primary efficiencies are already limited. Accordingly, implementations in which spectral power distribution 112 is changed without also changing display light 116 (in a manner that would change spectral power distribution 118) may be advantageous in certain examples.

Figure 2A:
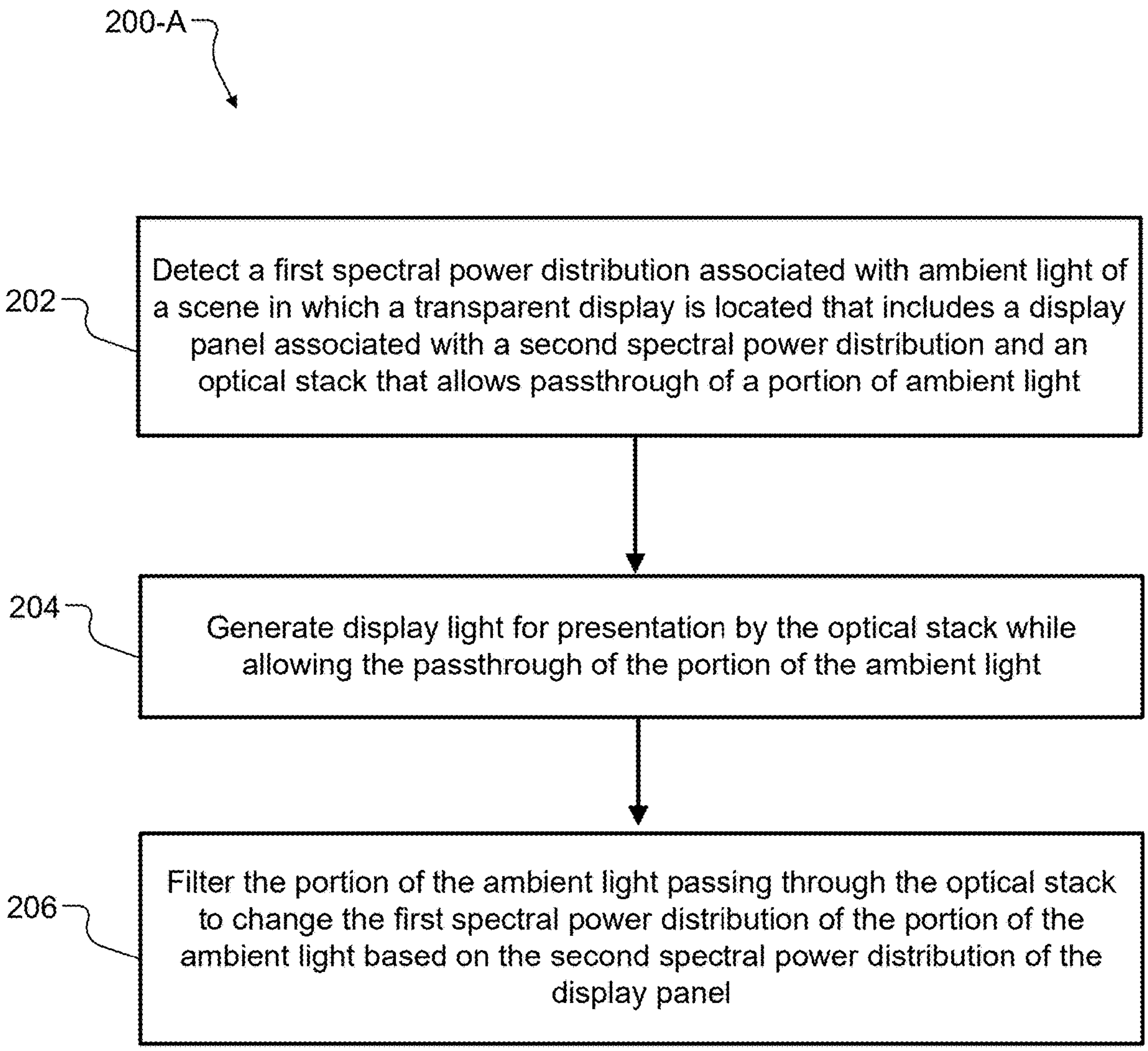
FIGS. 2A and 2B show illustrative methods for ambient light management for a transparent display in accordance with principles described herein.
Figure 2B:
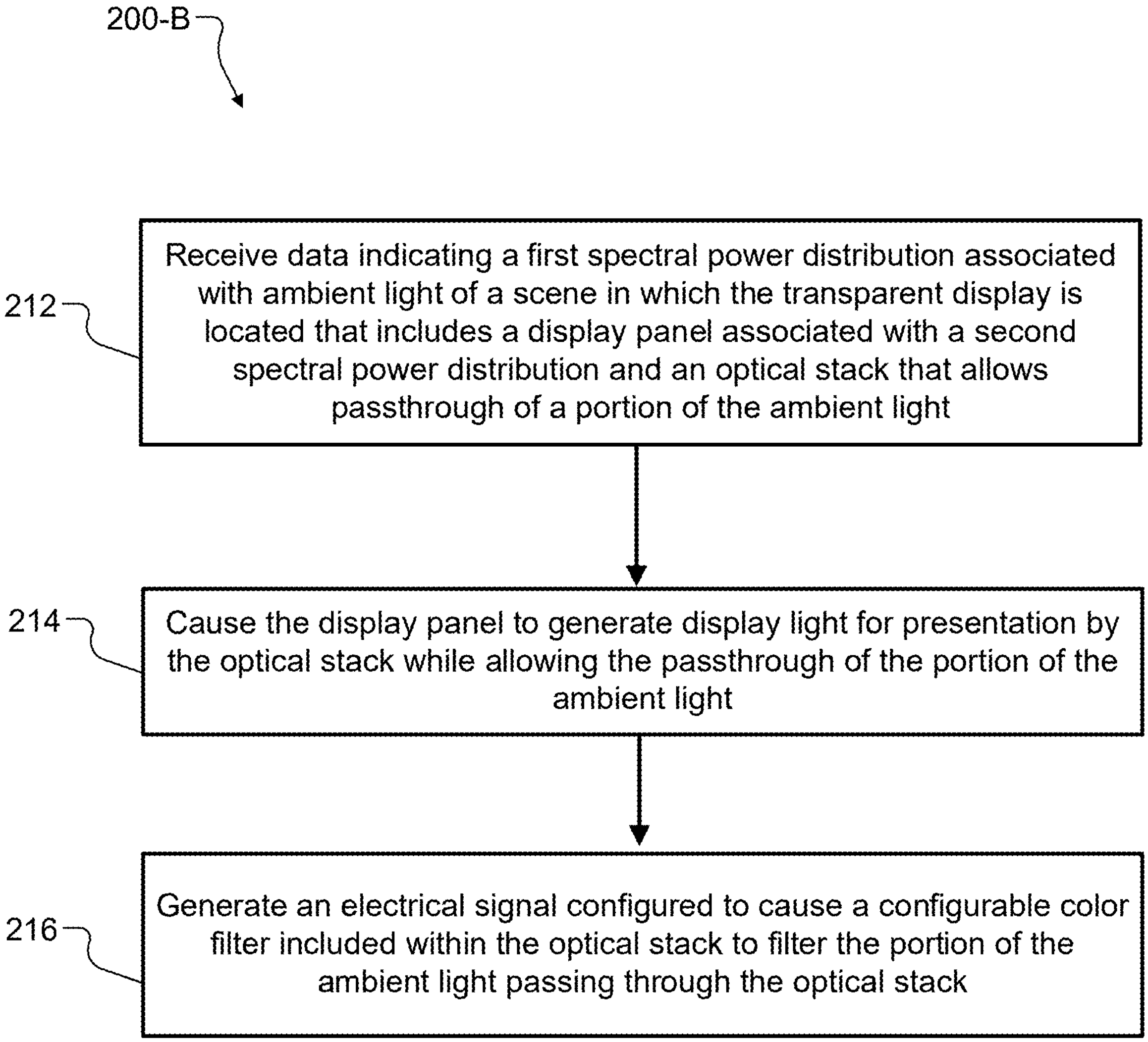

FIGS. 2A and 2B show illustrative methods 200-A and 200-B, respectively, for ambient light management for a transparent display in accordance with principles described herein. Methods 200-A and 200-B show specific sequences of operations that may be performed by a display system (e.g., a display system with a transparent display such as the display system of augmented reality glasses device 102 described above). However, while FIGS. 2A and 2B show illustrative operations according to specific implementations (e.g., operations 202-206 of method 200-A and operations 212-216 of method 200-B), it will be understood that other methods and processes utilizing similar principles as described for methods 200-A and 200-B may omit, add to, reorder, and/or modify any of the operations shown in FIGS. 2A and 2B. While these operations are illustrated with arrows suggestive of a sequential order of operation, it will be understood that some or all of the operations of methods 200-A and/or 200-B may be performed concurrently (e.g., in parallel) with one another or in orders different from those shown. Each operation of methods 200-A and 200-B will now be described in more detail as the operations may be performed by a display system used by a user (e.g., a transparent display system such as augmented reality glasses device 102 being used by user 104, as one example). For instance, methods 200-A and/or 200-B may be embodied as instructions that are stored on a non-transitory computer-readable medium and that, when executed, cause a processor (e.g., of a transparent display, of a display system that includes a transparent display, etc.) to perform the methods.

At operation 202 of method 200-A (in FIG. 2A), a display system may detect a first spectral power distribution associated with ambient light of a scene in which a transparent display is located. For example, the display system may include the transparent display and may include an ambient light sensor (integrated with or separate from the transparent display) that performs the detection at operation 202. In some examples, the first spectral power distribution detected at operation 202 may be represented by a detailed and highly accurate set of data, such as may be detected by a spectrometer or other relatively sophisticated sensor. In other implementations, the first spectral power distribution detected at operation 202 may be represented by a simpler data set such as white point coordinates with respect to a chromaticity space, a spectral power distribution graph with less detail or resolution, or the like. This type of data may be detected by ambient light sensors implemented by color sensors, cameras, or other less sophisticated sensors. In either case, the spectral power distribution detected at operation 202 may be analogous to the spectral power distribution 112 described and illustrated above for the ambient light 110 at scene 106.

The transparent display of the display system may include a display panel that is associated with a second spectral power distribution. For example, the second spectral power distribution may be analogous to the spectral power distribution 118 of display light 116 described and illustrated above in relation to the example of FIG. 1. In other words, the second spectral power distribution may be a native spectral power distribution that the display panel is configured to output when the color is not otherwise altered. As described above in the example of FIG. 1, the first and second spectral power distributions may not match very closely, particularly when the display system is used in lighting environments very different from those that the display panel is tuned for (e.g., certain outdoor environments with natural lighting if the display panel is designed for indoor use with artificial lighting, etc.). The transparent display of the display system may further include an optical stack (e.g., a lens stack for glasses-type devices, other form factors for devices such as smart windows, etc.) that allows passthrough of a portion of the ambient light. This is illustrated, for example, by the lens stack of augmented reality glasses device 102 in FIG. 1, which allows passthrough of portion 114 of the ambient light 110.

At operation 204 of method 200-A, the display system may generate display light for presentation by the optical stack while allowing the passthrough of the portion of the ambient light. For example, the display light may be generated by the display panel and transmitted (e.g., by way of a waveguide, by means of projection, etc.) to the optical stack so as to be presented to the user over background content from the ambient light being passed through the optical stack. The display light may include various colors depending on the content being presented. However, as mentioned above, the white point and/or spectral power distribution of the display light may be dictated (or at least influenced) by design parameters (e.g., color tuning parameters) of the display panel itself. For example, the specific combination of frequencies generated by the display panel to produce a pure white pixel in the display light may depend on the white point associated with the display panel, which may be represented by the second spectral power distribution.

At operation 206 of method 200-A, the display system may filter the portion of the ambient light passing through the optical stack to change the first spectral power distribution of the portion of the ambient light based on the second spectral power distribution of the display panel. For example, a configurable color filter included within the optical stack may be configured, based on the first spectral power distribution detected at operation 202, to filter the ambient light passing through the optical stack so as to have a spectral power distribution more similar to (e.g., resembling) the second spectral power distribution of the display panel. This configuring of the filter may be performed automatically, such as based on a signal from the ambient light sensor that represents the detected first spectral power distribution that is to be filtered to more closely conform to the second spectral power distribution.

Additionally, the display system may be configured to dynamically respond to changes in the ambient light of the scene, such as may occur when the user moves from one scene to another scene with different chromaticity (e.g., walking from an indoor scene to an outdoor scene), when the light of a given scene changes (e.g., when a different artificial light is used indoors, when changing cloud cover affects the chromaticity of sunlight, etc.), when the time of day changes (e.g., when sunlight chromaticity changes as the angle of the sun in the sky changes from sunrise to midday to sunset, etc.), and so forth. Specifically, for example, an operation (not explicitly shown in method 200-A) may be included in which the display system detects a change in the first spectral power distribution associated with the ambient light of the scene. Another operation may then be included in which the display system changes (e.g., in response to the detecting the change in the first spectral power distribution associated with the ambient light of the scene) the filtering of the portion of the ambient light passing through the optical stack. For instance, the signal from the ambient light sensor may change to cause the configurable color filter to alter the spectral profile of colors being filtered so as to make the changed first spectral power distribution continue to resemble the second spectral power distribution.

Turning to FIG. 2B, at operation 212 of method 200-B, a transparent display may receive, from an ambient light sensor, data indicating a first spectral power distribution associated with ambient light of a scene in which the transparent display is located. Similarly as described above, the transparent display may include a display panel associated with a second spectral power distribution, as well as an optical stack that allows passthrough of a portion of the ambient light.

At operation 214 of method 200-B, the transparent display may cause the display panel to generate display light for presentation by the optical stack while allowing the passthrough of the portion of the ambient light. For example, a processor of the transparent display may direct certain content (e.g., virtual objects or text content for an augmented reality implementation) to be displayed by the display panel and optical elements (e.g., waveguides, gratings, etc.) may help transmit the display content to be presented as if originating at the optical stack (e.g., overlaid onto background content visible via the portion of the ambient light that is passing through the optical stack).

At operation 216 of method 200-B, the transparent display may generate an electrical signal. For example, the electrical signal may be based on the data indicating the first spectral power distribution (of the passthrough portion of the ambient light), as well as data indicating the second spectral power distribution (of the display panel). The electrical signal may be configured to cause a configurable color filter included within the optical stack to filter the portion of the ambient light passing through the optical stack. For example, the electrical signal may cause the configurable color filter to filter the ambient light so that its spectral power distribution will be similar (e.g., in shape, in magnitude, etc.) to the second spectral power distribution of the display panel.

As with method 200-A described above, method 200-B may also be configured to dynamically respond to changes in the ambient light of the scene. Specifically, for example, an operation (not explicitly shown in method 200-B) may be included in which the transparent display receives, from the ambient light sensor, additional data indicating a change in the first spectral power distribution associated with the ambient light of the scene. Another operation may then be included in which the transparent display changes the electrical signal based on the additional data. For instance, the electrical signal may be changed such that the configurable color filter is directed to alter the spectral profile of colors being filtered so as to allow the altered first spectral power distribution to continue resembling the static second spectral power distribution.

Figure 3:
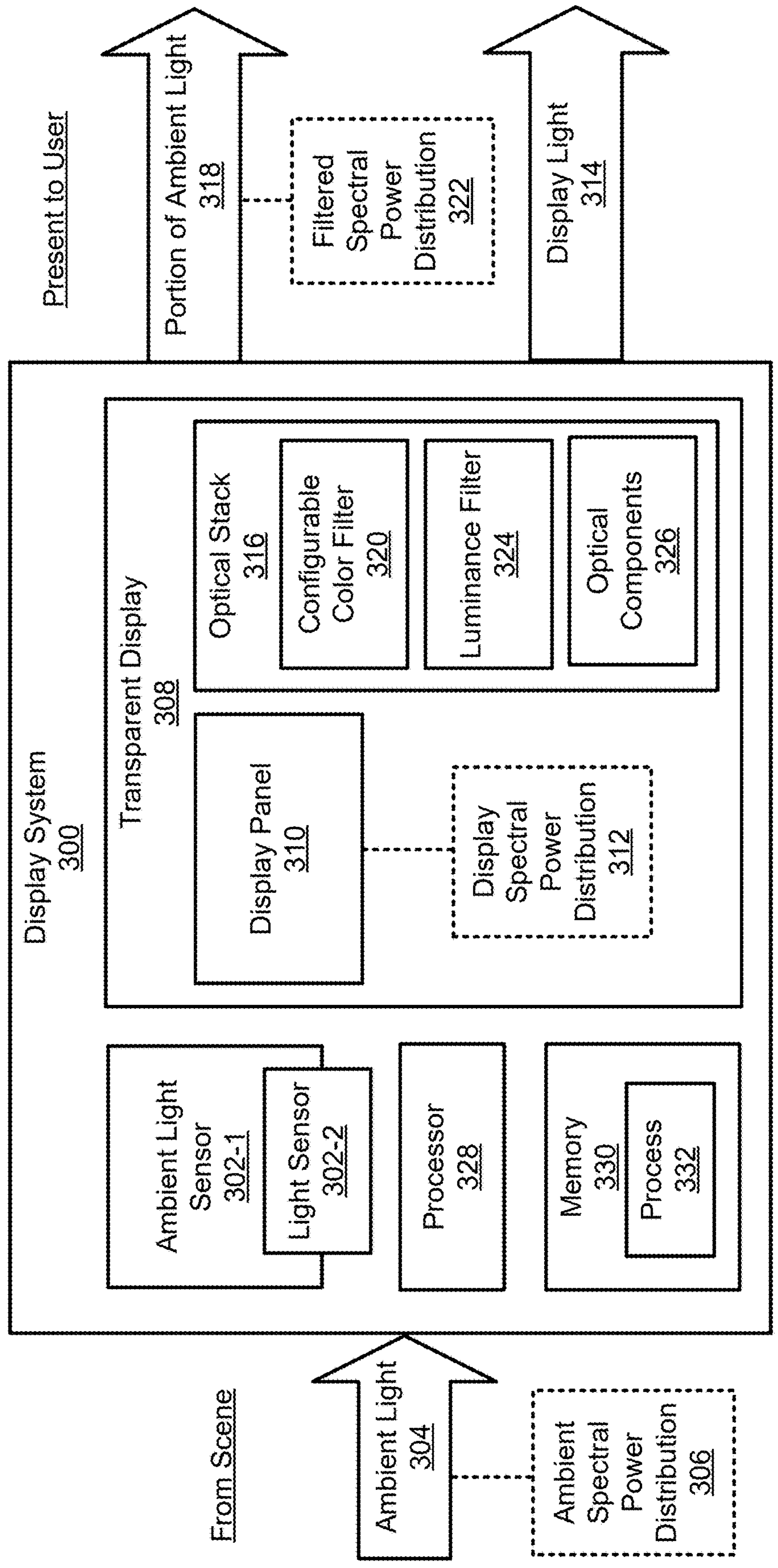
FIG. 3 shows an illustrative display system configured to perform spectral power distribution management for ambient light passing through a transparent display of the display system in accordance with principles described herein.

FIG. 3 shows an illustrative display system 300 configured to perform ambient light management for a transparent display in accordance with principles described herein. Put another way, system 300 may perform spectral power distribution management for ambient light passing through a transparent display of the display system. As shown in FIG. 3, display system 300 may include an ambient light sensor 302-1 configured to detect a first spectral power distribution associated with ambient light 304 passing through display system 300. More particularly, ambient light sensor 302-1 may detect that ambient light 304 is associated with an ambient spectral power distribution 306. One or more additional light sensors may also be included to assist ambient light sensor 302-1 and/or to perform other tasks described herein, as illustrated by a general light sensor 302-2.

Display system 300 may further include a transparent display 308 that, as shown, may itself include a display panel 310 that is associated with a second spectral power distribution (i.e., a display spectral power distribution 312) and that may be configured to generate display light 314. Transparent display 308 is also shown to include an optical stack 316 that may be configured to present display light 314 while allowing passthrough of a portion 318 of the ambient light 304. As shown, optical stack 316 may include a configurable color filter 320 that filters the portion 318 of the ambient light 304 to change the first spectral power distribution (i.e., ambient spectral power distribution 306) based on the second spectral power distribution (i.e., display spectral power distribution 312) in any of the ways described herein. As a result, the portion 318 of ambient light 304 that is passed through display system 300 is shown to be associated with a filtered spectral power distribution 322. For example, configurable color filter 320 may be a version of ambient spectral power distribution 306 that is dynamically filtered to resemble display spectral power distribution 312. Optical stack 316 is further shown to include, in this example, a luminance filter 324 and additional optical components 326.

Together with the light sensors (ambient light sensor 302-1 and light sensor 302-2) and the transparent display 308, display system 300 is also shown to include other components such as a processor 328 and a memory 330 storing instructions that embody a process 332. It will also be understood that display system 300 may include a variety of other components that are not explicitly shown in FIG. 3 due to being outside the scope of the ambient light management description that is provided. More particularly, each element shown in FIG. 3 will now be described in more detail in the context of ambient light management implementations described herein.

Display system 300 may represent any display system with the illustrated components as may be suitable for any of the applications or use cases mentioned herein. For example, display system 300 may represent an augmented reality device such as an augmented reality glasses device or other similar head-mounted display device used for extended reality (e.g., augmented reality, mixed reality, virtual reality, etc.) applications. In other examples, display system 300 could represent a display system that is built into a window (e.g., a car windshield, a smart window in a building or airplane, etc.), an appliance (e.g., a smart refrigerator, a smart oven, etc.), a non-wearable computing device (e.g., a computer monitor that uses a transparent screen, etc.), or the like.

Ambient light sensor 302-1 may be implemented by any suitable sensor that can receive ambient light 304 from the environment and analyze that ambient light 304 to determine (e.g., detect, measure, estimate, etc.) that it is characterized by ambient spectral power distribution 306. As mentioned above, ambient spectral power distribution 306 may be detected with a high level of accuracy and precision in certain implementations or may be estimated more roughly in other implementations, depending on the nature of the use case and the parameters of the application. For example, ambient light sensor 302-1 could be implemented, in certain implementations, by a spectrometer instrument that is highly versatile and accurate for measuring the ambient spectral power distribution 306. A spectrometer may, for example, separate incoming ambient light into its constituent wavelengths and measure the intensity at each wavelength to generate a full graph of the relevant portion of the light spectrum such as illustrated in spectral power distribution 112 above. A spectrometer sensor may function by use of a grown grating (e.g., a diffraction grating to disperse light into component colors that are then detected by an array of sensors), a prism (e.g., to separate light based on its refractive index at different wavelengths), a sensor array configured to capture the light spectrum across a range of wavelengths simultaneously, and/or any other such light processing components using other suitable techniques.

Similarly, ambient light sensor 302-1 could be implemented, in certain implementations, by a spectrophotometer that performs similar functions as described above but with focus on measuring the intensity of light at specific predefined wavelengths (i.e., so as to be less versatile but more cost-effective for certain applications). In still other implementations, ambient light sensor 302-1 may be implemented by a lower cost or more practical color sensor that may detect ambient spectral power distribution 306 in a less robust or detailed manner (e.g., detecting where the white point is relative to a white point of a standard illuminant, etc.). For example, a color sensor may operate by combining multiple photodetectors with different spectral sensitivities to provide an output that corresponds to a specific color space (e.g., RGB, etc.).

While ambient light sensor 302-1 is understood to represent the ambient light sensor that determines ambient spectral power distribution 306 based on incoming ambient light 304, one or more other light sensors (of the same or different types) may also be used to assist ambient light sensor 302-1 in its tasks and/or to perform other light detection functions described herein. As one example, light sensor 302-2 may represent a camera or other such light sensor that is configured to differentiate spectral properties in different parts of the portion of ambient light 304 passing through the optical stack (e.g., so as to differentiate that a portion of the light in one area is blue because it reflects from a blue object, another portion of the light in another area is red because it reflects from a red object, etc.). In some examples, light sensor 302-2 may be implemented by a hyper-spectral camera that determines spectral content (e.g., individual estimations of the spectral power distribution) of incoming ambient light on a pixel-by-pixel basis. As will be described and illustrated in more detail below, such sensors may be used to allow filters such as configurable color filter 320 and/or luminance filter 324 to locally filter different parts of the portion 318 of the ambient light 304 differently in accordance with the differentiated spectral properties.

As has been mentioned, ambient light 304 may represent the ambient light in the scene where display system 300 is being used. For example, referring to the description above in relation to FIG. 1, display system 300 may be analogous to augmented reality glasses device 102 and, when used in a scene such as scene 106, ambient light 304 may be analogous to ambient light 110. Ambient spectral power distribution 306 may then represent or indicate the chromaticity of that ambient light, analogous to the spectral power distribution 112 illustrated in FIG. 1.

Transparent display 308 may be implemented by any display that is configured to combine ambient light (e.g., the portion 318 of ambient light 304) with light generated by a display panel (e.g., the display light 314 generated by display panel 310). To this end, transparent display 308 may allow light to pass through while also providing waveguides and/or other means of projection for display content to be overlaid onto background content from the environment. Transparent displays are also referred to as see-through displays, heads-up displays, and by other names. While various principles described herein may also apply to other type of displays (e.g., non-transparent displays such as standard computer monitors, televisions, smartphone screens, and mixed reality devices with video passthrough), display systems with transparent displays are of particular interest for ambient light management described herein for the reasons described above.

Display panel 310 may be implemented as any suitable display panel including an array of pixels implemented using any display technology as may serve a particular implementation. As one example, display panel 310 could be implemented by a micro-LED panel that is small enough in form factor to be embedded in a device such as an augmented reality glasses device (e.g., in the bridge or temple of the glasses, etc.) but that may also include a suitable number of pixels to provide a desired resolution for the display content. Based on the way that display panel 310 is designed and tuned, the display spectral power distribution 312 may be associated with display panel 310 as an intrinsic property of the panel. As has been mentioned, an objective of display system 300 may then be to allow the display spectral power distribution 312 of display panel 310 to remain static (or at least to change less than it might otherwise change) as filtering of ambient light 304 causes the ambient spectral power distribution 306 to match or more closely resemble display spectral power distribution 312.

To this end, optical stack 316 is shown to include various elements that help perform this filtering of the incoming ambient light, as well as other desirable operations such as putting display light 314 into its desired position on transparent display 308, combining display light 314 with the portion 318 of ambient light 304, and so forth. For example, optical stack 316 is shown to include the configurable color filter 320 for spectral or chrominance filtering, the luminance filter 324 for contrast or luminance filtering, and one or more additional optical component 326 for otherwise guiding, steering, combining, focusing, magnifying, and/or otherwise processing display light 314 and/or the portion 318 of incoming ambient light. Optical stack 316 may be implemented as a lens stack for an augmented reality glasses device such as augmented reality glasses device 102 (which may include a separate lens stack for each eye), or as an analogous set of optical components for other form factors (e.g., smart windows, etc.).

Configurable color filter 320 may be configured to filter light passing through optical stack 316 in a frequency-discriminating manner. That is, configurable color filter 320 may be configured to filter or tint the light passing through (e.g., the portion 318 of ambient light 304) so as to reduce some light frequencies more than others and to thereby change the overall spectral power distribution (e.g., from ambient spectral power distribution 306 to filtered spectral power distribution 322). In some examples, configurable color filter 320 may be configured to perform this color filtering function dynamically in response to changes to ambient light 304 in the environment. For example, processor 328 may be configured to generate an electrical signal based on information from ambient light sensor 302-1 that indicates ambient spectral power distribution 306, and further based on display spectral power distribution 312 of display panel 310 (which may be a known quantity of the system and stored, for example, in memory 330). The electrical signal may be configured to indicate to configurable color filter 320 what dynamic filtering is to be performed to cause ambient spectral power distribution 306 to conform to display spectral power distribution 312. For example, configurable color filter 320 may include an electrochromic material configured to filter the portion 318 of ambient light 304 based on the electrical signal.

In this way, filtered spectral power distribution 322 of portion 318 of the ambient light may be made to resemble display spectral power distribution 312 of display panel 310 more closely than it resembles ambient spectral power distribution 306 of the rest of the ambient light 304 in the environment. Though this resemblance may not be perfect, filtered spectral power distribution 322 may be referred to herein as resembling display spectral power distribution 312 when configurable color filter 320 filters the light such that its spectral power distribution substantially matches display spectral power distribution 312 (e.g., in shape, in magnitude, etc.) or at least resembles display spectral power distribution 312 more closely than it resembles ambient spectral power distribution 306 (e.g., has a white point more proximate in CIE color space to the white point of display panel 310 than to the white point of ambient light 304). Examples of such resemblances are illustrated and described in more detail below.

Any suitable electrochromic material or combination of materials may be employed to allow configurable color filter 320 to perform functions described herein. In some examples, different materials activated by different channels of the electrical signal (e.g., an analog or digital signal with a plurality of channels) may control or excite different layers of the filter. One class of electrochromic materials that may be used, for example, includes transition metal oxides such as a tungsten oxide, a vanadium dioxide, or the like. Other electrochromic materials include organic materials such as viologens, polyelectrolytes, and so forth. Emerging nano-structured materials and other materials and technologies (e.g., liquid crystal technologies, notch filters, etc.) could also be employed to help implement the desired filtering described herein. Various factors may be considered in choosing which electrochromic materials to use in constructing configurable color filter 320. For example, these factors may include, but are not limited to, performance (how accurately and precisely the color change can be controlled), switching speed and responsiveness, durability, stability, cost, and scalability.

Additionally, while dynamic implementations of configurable color filter 320 that can automatically adjust their properties based on conditions in the environment (e.g., based on the electrical signal derived from ambient spectral power distribution 306 and display spectral power distribution 312), it will also be understood that more static implementations of configurable color filter 320 could be used in certain examples. For example, a user may have a set of different color filters that are designed to be physically switched out of optical stack 316. Rather than an electrical signal that automatically causes configurable color filter 320 to change the frequencies it is filtering, for instance, display system 300 may determine which filter in the set of color filters is most appropriate given the current ambient spectral power distribution, and may provide instructions or another indication to the user to manually switch out configurable color filter 320 to replace it with the appropriate static color filter.

Luminance filter 324 may also (like configurable color filter 320) be configured to filter light passing through optical stack 316. However, whereas configurable color filter 320 may filter based on color (light frequency), luminance filter 324 may be configured to reduce the overall brightness of the light without regard to color. That is, luminance filter 324 may be configured to filter the light passing through (e.g., the portion 318 of ambient light 304) so as to reduce all light frequencies in a substantially flat manner to thereby maintain the shape of the spectral power distribution while altering the contrast between display light 314 and the portion 318 of ambient light 304 that passes through. For example, if it is a bright day and display system 300 is used in an outdoor environment, luminance filter 324 may decrease the luminance (brightness) of incoming ambient light 304 (at least for portions of transparent display 308 where display light 314 is presenting content) to thereby improve the contrast and make the display content easier to see. Similarly as described above with respect to configurable color filter 320, luminance filter 324 may be configured to perform this luminance filtering function dynamically in response to changes to ambient light 304 in the environment. For example, processor 328 may be configured to generate an electrical signal (e.g., the same or an additional electrical signal as described above) based on information from ambient light sensor 302-1 that indicates a luminance of ambient light 304. This electrical signal may be configured to indicate to luminance filter 324 what filtering is to be performed to reduce the brightness of the portion 318 of ambient light 304 to improve the contrast of transparent display 308 as described above.

Additional optical components 326 may represent any other layers of optical stack 316 and/or any other optical devices used by transparent display 308 to process or direct either the portion 318 of ambient light or display light 314. As one example, for instance, optical components 326 may include an optical combiner configured to combine display light 314 and the portion 318 of ambient light 304 that passes through optical stack 316. In this example, the optical combiner and the filters (i.e., configurable color filter 320 and luminance filter 324) may be positioned within optical stack 316 such that the portion 318 of the ambient light is filtered (e.g., by configurable color filter 320 and/or luminance filter 324) without display light 314 also being filtered. In other words, the optical combiner may be configured to add display light 314 to the ambient light after the filtering has been performed on the ambient light so that the display light is not reduced in brightness or filtered chromatically. Other additional optical components 326 may include a waveguide configured to transport display light 314 from display panel 310 to optical stack 316, lenses configured to magnify or otherwise process light (e.g., to implement prescription glasses, etc.), and/or any other optical components as may serve a particular implementation.

Processor 328 may represent or include one or more of any type of computer processor or processing resources configured to execute instructions stored in memory 330 to thereby perform process 332. For example, process 332 may include any of the methods or processes described herein (e.g., method 200-A, method 200-B, etc.) and may be directed by processor 328 in accordance with instructions stored in memory 330. In some examples, process 332 may be loaded into memory 330 from a non-transitory computer-readable medium (not shown) storing instructions that, when executed, cause processor 328 to perform process 332 in any of the ways described herein. In some examples, such as illustrated in the example of display system 300 in FIG. 3, processor 328 may be integrated with other components (e.g., sensors, the display, etc.) of display system 300. For instance, processor 328 may represent processing resources integrated in a head-mounted display device. In other examples, however, some or all of the processing may be offloaded to processing resources located elsewhere. For example, a wired or wireless link (e.g., a Bluetooth link, etc.) may connect display system 300 to a separate computing system such as a mobile device carried by a user wearing a head-mounted display implementation of display system 300, a cloud server or multi-access edge compute server, a primary CPU of a vehicle for a windshield implementation of display system 300, or the like. Processing resources of the separate computing system perform some or all of the computations associated with process 332, which may also be stored as instructions in integrated memory or offloaded memory in a similar way.

Figure 4A:
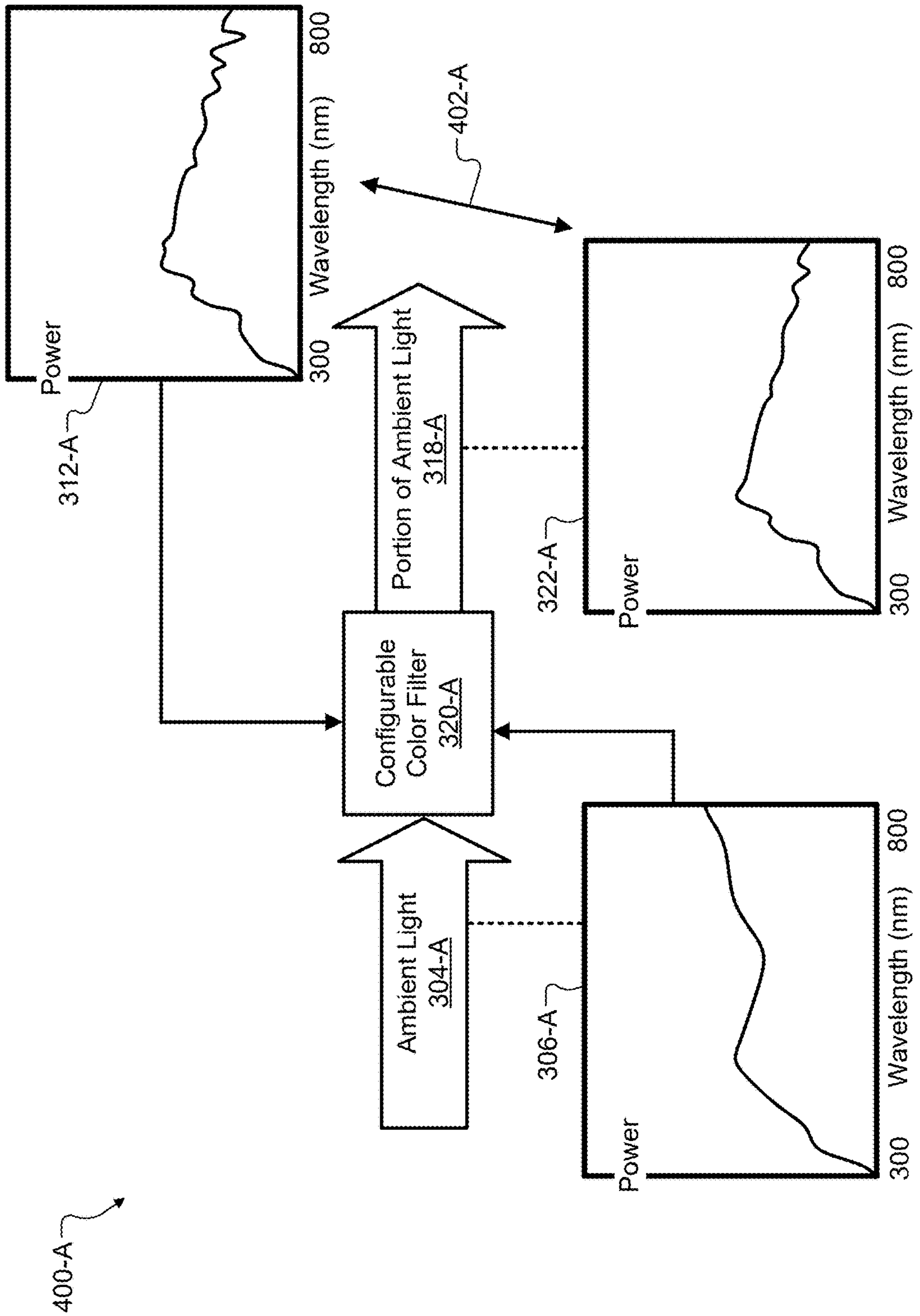
FIGS. 4A-4C show example ambient light management scenarios in which a configurable color filter filters a portion of ambient light based on a target spectral power distribution in accordance with principles described herein.
Figure 4B:
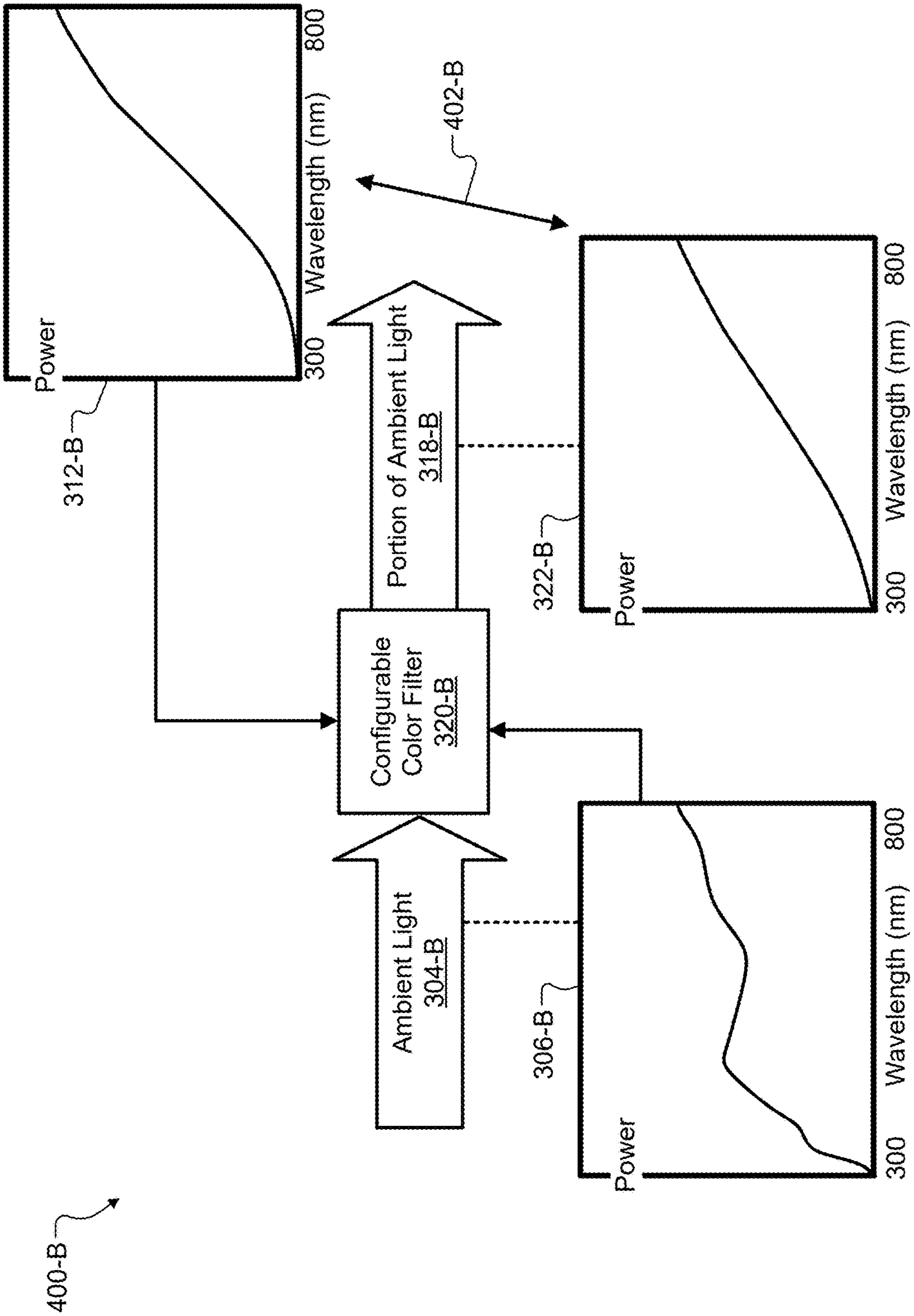
Figure 4C:
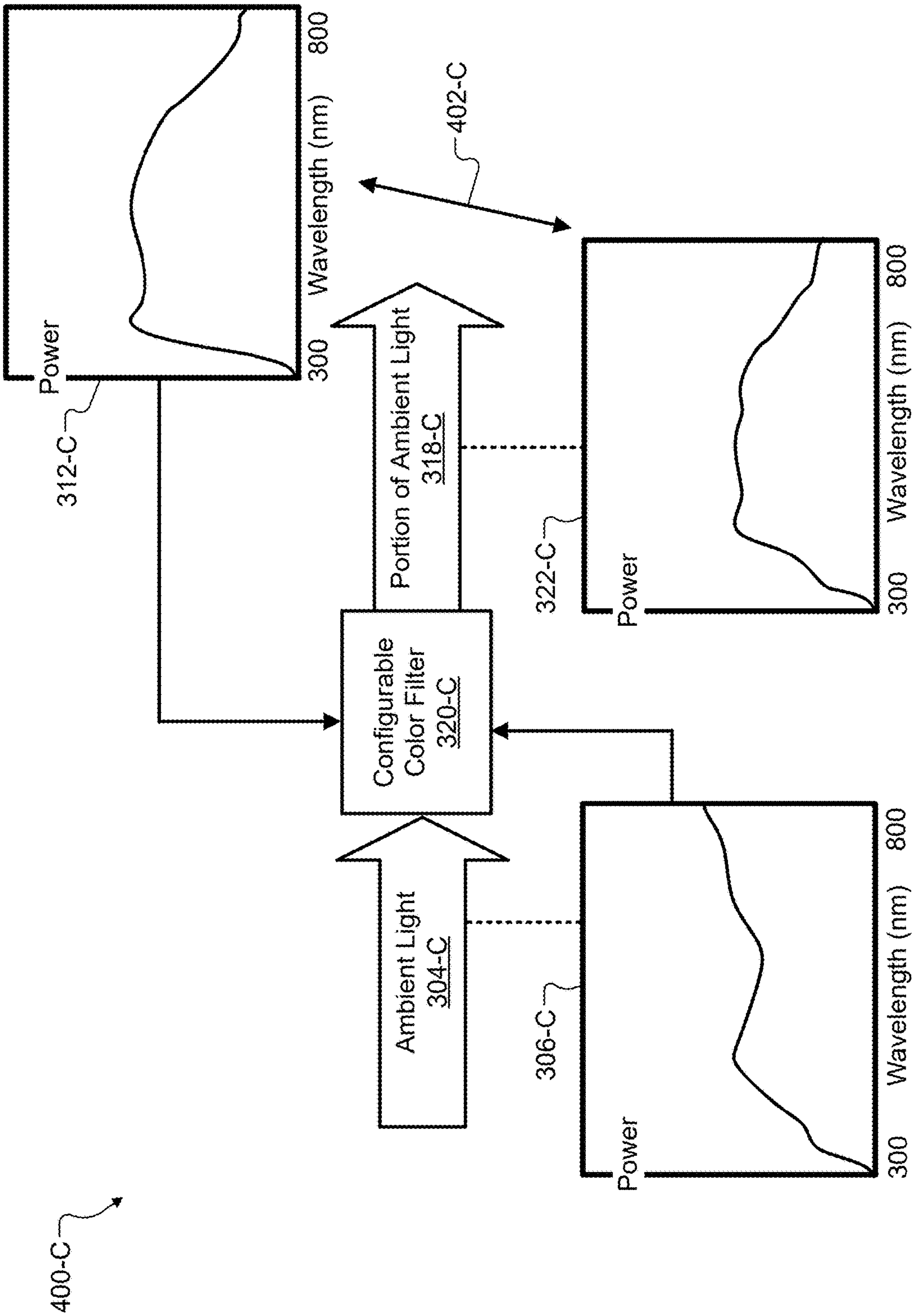

To illustrate the principles described above for display system 300 in operation, FIGS. 4A-4C show example ambient light management scenarios in which a configurable color filter filters a portion of ambient light based on a target spectral power distribution. Specifically, as shown, FIG. 4A shows a first scenario 400-A, FIG. 4B shows a second scenario 400-B, and FIG. 4C shows a third scenario 400-C. In each of these illustrative scenarios 400-A, 400-B, and 400-C, elements described above in relation to display system 300 are shown with similar numbering as illustrated in FIG. 3. However, to distinguish the different implementations of these elements in the various example scenarios, the reference numbers are appended with distinguishing letters A, B, or C. For example, all three FIGS. 4A-4C include ambient light 304, but these are labeled as ambient light 304-A (in scenario 400-A), ambient light 304-B (in scenario 400-B) and ambient light 304-C (in scenario 400-C) to differentiate the attributes of the ambient light in the different examples (e.g., including that the ambient light in each scenario is characterized by a different ambient spectral power distribution 306-A, 306-B, and 306-C).

In each of the examples, an implementation of configurable color filter 320 (e.g., configurable color filter 320-A, 320-B, or 320-C) is shown to receive ambient light 304 (e.g., ambient light 304-A, 304-B, or 304-C) that is characterized by an ambient spectral power distribution 306 (e.g., ambient spectral power distribution 306-A, 306-B, or 306-C) based on the environment in the different scenarios. The configurable color filter 320 is shown to pass through a portion 318 (e.g., portion 318-A, 318-B, or 318-C) of this ambient light, filtering the light along the way. More particularly, as has been described, if the ambient light 304 is to be combined with display light 314 from a particular display panel 310 with a display spectral power distribution 312 (e.g., display spectral power distribution 312-A, 312-B, or 312-C), the respective configurable color filters 320 may be configured to filter the respective portions 318 of ambient light to transform the respective ambient spectral power distribution 306 to resemble the respective display spectral power distribution 312.

Specifically, as shown, each respective portion 318 of ambient light, after passing through the respective configurable color filter 320, is characterized by a respective filtered spectral power distribution 322 (e.g., filtered spectral power distribution 322-A, 322-B, or 322-C) that has a resemblance 402 (e.g., resemblance 402-A, 402-B, or 402-C) with the respective display spectral power distribution 312 of the display panel. Even if these resemblances 402 may not be perfect resemblances (i.e., the respective filtered spectral power distributions and display spectral power distribution may not be identical), it is shown that basic shape, magnitude, and other attributes of the spectral power distributions are similar and that, in any case, the filtered spectral power distributions 322 more closely resemble the respective the display spectral power distributions 312 than they resemble the ambient spectral power distributions 306 of the ambient light in the environment.

The example scenario 400-A in FIG. 4A, in particular, shows an implementation in which the spectral power distribution 312-A of the display panel (the target spectral power distribution in this example) is associated with an average daylight (D65) illuminant, and in which the spectral power distribution 306-A of ambient light 304-A is detected to be offset from that spectral power distribution 312-A. As such, it will be understood that, in scenario 400-A, the display panel 310 may be configured to match average daylight conditions (e.g., for use outdoors and in other naturally illuminated environments), but the environment in which the display system 300 is being used may not be such an environment. To the contrary, it may be detected that some sort of artificial lighting with ambient spectral power distribution 306-A is illuminating the scene of scenario 400-A. Accordingly, as shown, configurable color filter 320-A filters or tints the portion 318-A of ambient light 304-A so that spectral power distribution 322-A of the light passing through has the resemblance 402-A with spectral power distribution 312-A.

As another example, scenario 400-B in FIG. 4B shows an implementation in which the spectral power distribution 312-B of the display panel (the target spectral power distribution in this example) is associated with an incandescent lighting (A) illuminant or a fluorescent lighting (F) illuminant, and in which the spectral power distribution 306-B of ambient light 304-B is detected to be offset from that spectral power distribution 312-B. As such, it will be understood that, in scenario 400-B, the display panel 310 may be configured to match typical indoor lighting conditions (e.g., where artificial light such as incandescent or fluorescent light is more prevalent than natural sunlight) while the environment in which the display system 300 is being used may not be an environment illuminated in this way. For example, it may be detected that a different type of artificial lighting, with ambient spectral power distribution 306-B, is illuminating the scene of scenario 400-B. Accordingly, as shown, configurable color filter 320-B filters or tints the portion 318-B of ambient light 304-B so that spectral power distribution 322-B of the light passing through has the resemblance 402-B with spectral power distribution 312-B.

As yet another example, scenario 400-C in FIG. 4C shows an implementation in which the display panel 310 of the transparent display 308 is a micro-light-emitting-diode (micro-LED) panel and the spectral power distribution 312-C of the micro-LED panel (the target spectral power distribution in this example) is skewed away from a red portion of a color spectrum toward at least one of a green portion of the color spectrum and a blue portion of the color spectrum. In other words, due to physical characteristics of semiconductor materials from which micro-LED panels are constructed, these displays may tend to lack red efficiency, resulting in relatively low red channel luminance. Due to this limitation, the micro-LED display may benefit, for example, from a bluer display white point in the sense that the display would be able to achieve a higher overall luminance by being skewed away from the red portion of the spectrum and focusing more on the strengths of the display technology in other portions of the spectrum (e.g., blue, green, etc.). As such, whatever the environment may be in scenario 400-C, the display panel 310 itself may be configured to have an offset white point center skewing away from red to help widen the color gamut that can be displayed, increase the red efficiency, increase the overall luminance of the display light, and so forth. Accordingly, if it is detected that particular light conditions are present at the scene with particular ambient spectral power distribution 306-C (e.g., a type of artificial lighting in this example), configurable color filter 320-C may filter or tint the portion 318-C of ambient light 304-C so that spectral power distribution 322-C of the light passing through has the resemblance 402-C with spectral power distribution 312-C.

In some implementations, configurable color filters described herein (including any of the implementations or configurations of configurable color filter 320 above) may be applied to an optical stack in a manner that entirely or substantially covers the whole of the optical stack (e.g., so as to filter the entire portion of ambient light passing through the optical stack). As has been described, this type of global filtering of the ambient light received by the viewer may involve the configurable color filter filtering the portion of the ambient light (e.g., the portion 318 of the ambient light 304, to refer to various examples above) so as to transform the first spectral power distribution (e.g., the ambient spectral power distribution 306) of the portion of the ambient light to resemble the second spectral power distribution of the display panel (e.g., to resemble the display spectral power distribution 312, as illustrated by examples of filtered spectral power distribution 322 described above).

Figure 5A:
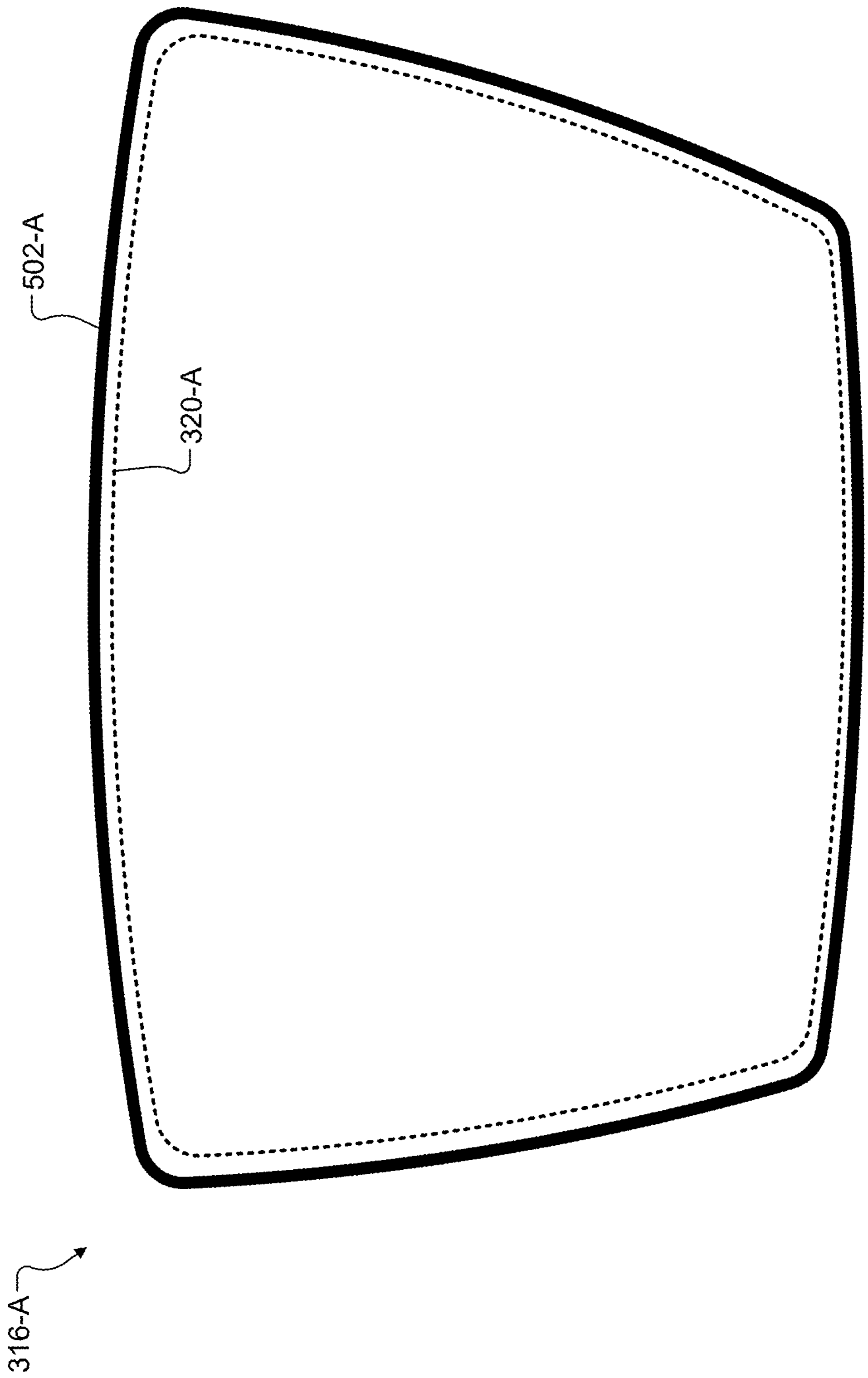
FIG. 5A shows an illustrative configuration for a lens stack in which a configurable color filter covers an entirety of a lens to filter the entire portion of ambient light passing through the lens in accordance with principles described herein.

To illustrate, FIG. 5A shows an example configuration for an optical stack 316-A in which a configurable color filter 320-A covers an entirety of a lens 502-A (or other suitable optical component in a particular form factor such as a smart window) to filter the entire portion of ambient light passing through the lens in accordance with principles described herein. As shown, FIG. 5A depicts lens 502-A and configurable color filter 320-A from a straight-on view showing the perspective a user would have when looking through the transparent display (and in contrast to side views depicted in previous figures). FIG. 5A illustrates a global filtering implementation in which all of the incoming ambient light is filtered in a similar manner to cause the ambient light to resemble a spectral power distribution associated with the display panel itself.

It will be understood, however, that other types of non-global implementations may also be useful. For example, a localized filtering implementation may include a light sensor (e.g., an implementation of light sensor 302-2 such as a standard camera, a hyperspectral camera, a set of bifurcated ambient light sensors, etc.) that is configured to differentiate spectral properties in different parts of the portion of the ambient light passing through the optical stack. In this type of implementation, the configurable color filter may then filter the different parts of the portion of the ambient light differently in accordance with the differentiated spectral properties.

Figure 5B:
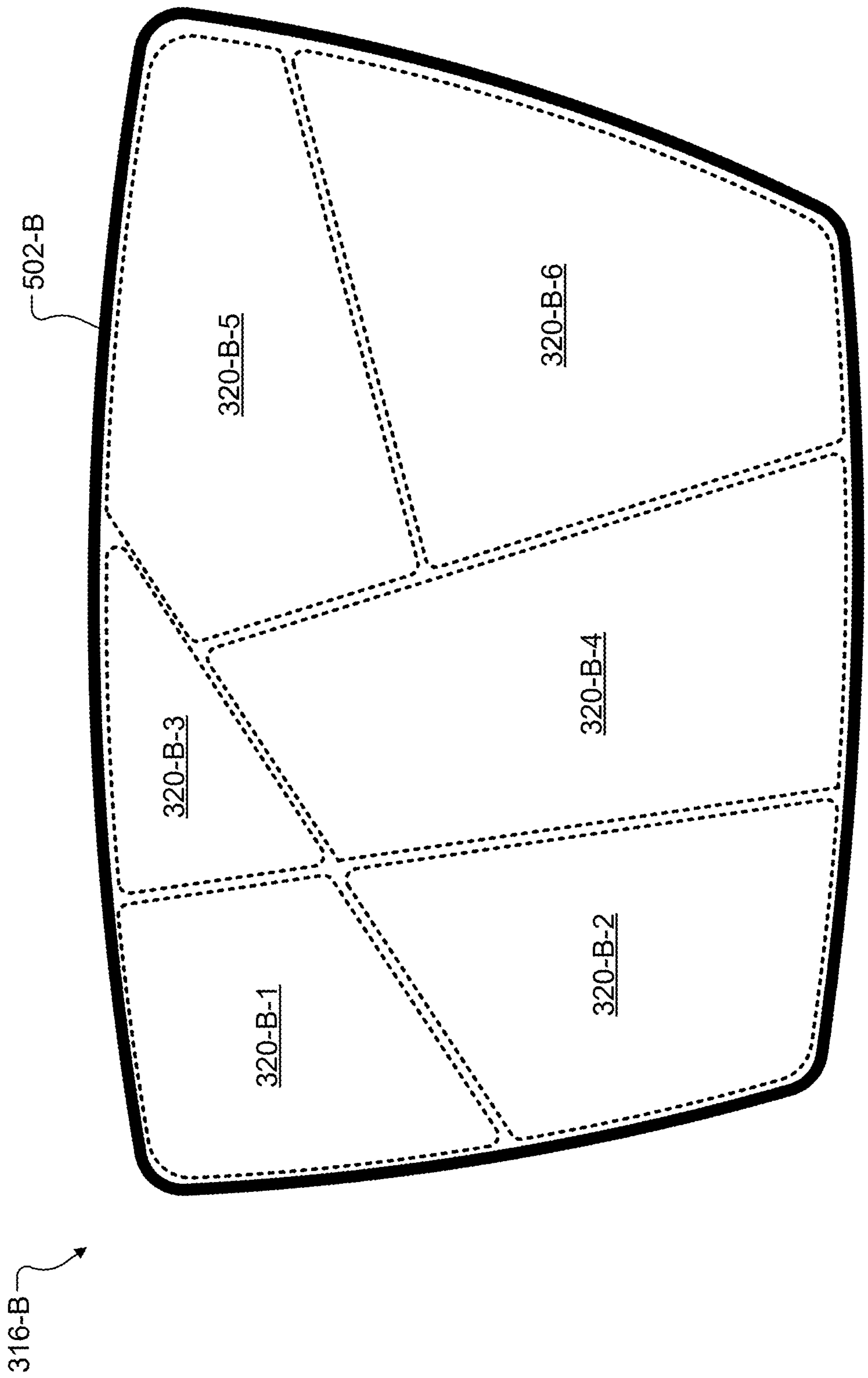
FIG. 5B shows an illustrative configuration for a lens stack in which a configurable color filter is segmented with respect to a lens to differently filter different parts of the portion of ambient light passing through the lens in accordance with principles described herein.

To illustrate, FIG. 5B shows an illustrative configuration for an optical stack 316-B in which a configurable color filter 320-B is segmented (e.g., into filter segments 320-B-1, 320-B-2, 320-B-3, 320-B-4, 320-B-5, and 320-B-6 in this example) with respect to a lens 502-B to differently filter different parts of the portion of ambient light passing through the lens in accordance with principles described herein. Similar to FIG. 5A, FIG. 5B depicts lens 502-B and configurable color filter 320-B (with its various filter segments) from a straight-on view showing the perspective a user would have when looking through the transparent display. In contrast to FIG. 5A, however, FIG. 5B illustrates a localized filtering implementation in which different parts of the incoming ambient light (which is referred to herein as the portion of ambient light to distinguish that portion from other ambient light in the environment) are filtered differently, based on the differentiated spectral properties that the different parts may be detected to have.

As one example, a light sensor (e.g., light sensor 302-2) may determine that a red object is visible in the top left region of the transparent display corresponding to filter segment 320-B-1. If green display content were to be superimposed over this red object, the content may be difficult to see and, in any event, may not appear to be very green due to the strong red background light that the green display light is combined with. Accordingly, the transparent display may be configured to filter out some of the red frequencies in filter segment 320-B-1 to improve the color contrast and facilitate the user in properly viewing the content as green in spite of the red background. At the same time, another portion of the display (e.g., the bottom right portion associated with display segment 320-B-6) may feature differently colored ambient light (e.g., from a differently-colored object positioned in that area in the environment) and/or a different color of display content that is to be displayed. As such, the display segment associated with this other portion of the display may be directed to filter different frequencies of the ambient light in accordance with those local conditions on that part of the display.

The various filter segments of configurable color filter 320-B in FIG. 5B will be understood to cover arbitrary and illustrative portions of the overall lens. For example, these portions may approximately coincide with certain objects detected by the display system to be visible through the optical stack. The number and shape of these filter segments are arbitrary in this example, however, and it will be understood that any plurality of different filter segments (e.g., from two segments to an individual segment for each pixel of the display panel) of any suitable shape may be employed. In some implementations, filter segments may be laid out in a grid-like fashion with discrete filters having any suitable ratio with the display pixels (all the way to a 1:1 ratio in which each filter is the size of a single pixel). The varying shapes of the filter segments shown in FIG. 5B may thus represent different groupings of smaller filters of the grid, as may be activated and used based on content visible through the transparent display. For example, in a blue room with a bright red plant, a number of small filter segments in approximately the shape of the plant may be selected from the grid to filter the red light from the plant without affecting other blue light from elsewhere in the room. Along these lines, it will be understood that filter segments may be static (e.g., the transparent display separated into quadrants with four different filter segments, etc.) or configured to be reshaped, resized, created, destroyed, and otherwise manipulated dynamically (e.g., using a grid such as described above or in other suitable ways) based on the environment and the real-world objects visible through the transparent display.

As described above, an optical stack such as optical stack 316-B may further include, along with the configurable color filter 320-B and its various filter segments, a luminance filter (e.g., luminance filter 324) that filters the portion of the ambient light to change a luminance of the portion of the ambient light. It will be understood that the luminance filter may be implemented with similar flexibility as has been described herein for configurable color filters. For example, there may be a global luminance filter that covers an entirety of the lens (e.g., similar to configurable color filter 320-A covering lens 502-A) to lower the luminance in accordance with how bright the ambient light is (and other conditions or settings). Conversely, other implementations could include a segmented luminance filter (e.g., similar to how configurable color filter 320-B is segmented into various filter segments across lens 502-B) to give more customized local coverage as needed (to lower the ambient luminance of bright objects in the world without doing the same for darker areas). Any combination of global and segmented color filters and luminance filters may be employed as may serve a particular implementation. For example, the color filter and luminance filter may both be global or may both be segmented (e.g., dynamically or statically). In other examples, the configurable color filter may be global with a (dynamically or statically) segmented luminance filter, or the luminance filter may be global with a (dynamically or statically) segmented color filter.

As has been mentioned, various methods and processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 6:
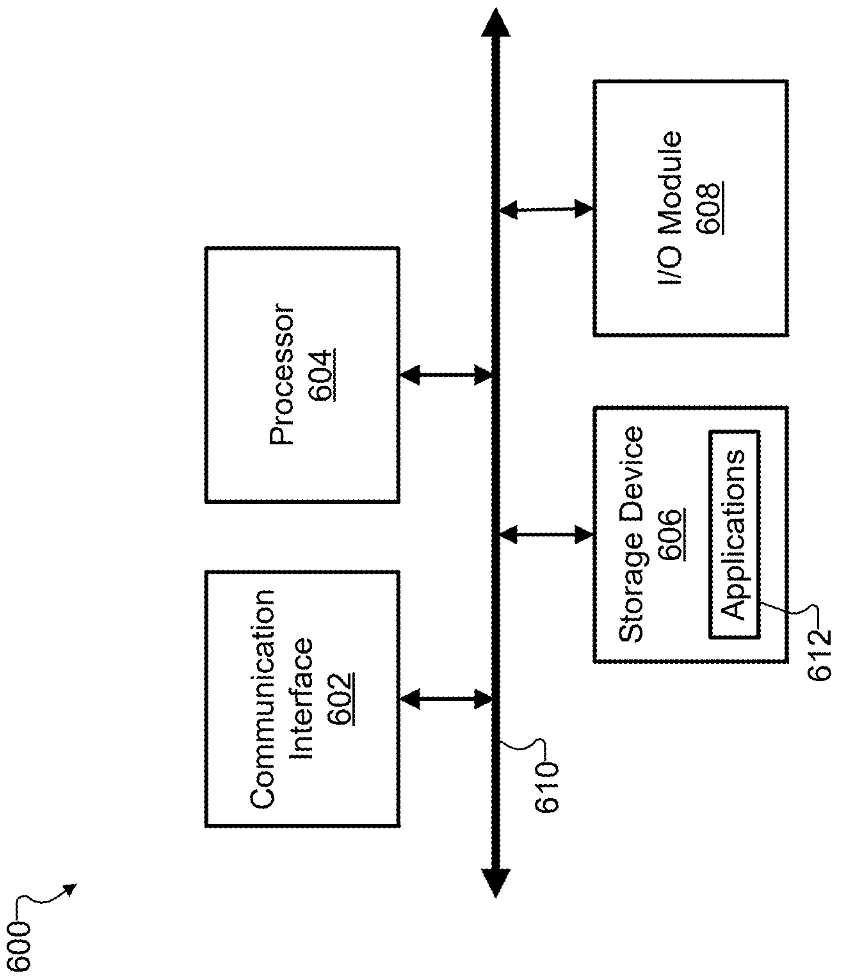
FIG. 6 shows an illustrative computing system that may be used to implement various devices and/or systems described herein.

FIG. 6 shows an illustrative computing system that may be used to implement various devices and/or systems described herein. For example, computing system 600 may include or implement (or partially implement) display system 300, any implementations or components thereof, and/or systems described herein that may interoperate with this display system.

As shown in FIG. 6, computing system 600 may include a communication interface 602, a processor 604, a storage device 606, and an input/output (I/O) module 608 communicatively connected via a communication infrastructure 610. While an illustrative computing system 600 is shown in FIG. 6, the components illustrated in FIG. 6 are not intended to be limiting. Additional or alternative components may be used in other embodiments. Components of computing system 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input for a single virtual experience. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

The following examples describe implementations of ambient light management for a transparent display in accordance with principles described herein:

Example 1: A system comprising: an ambient light sensor configured to detect a first spectral power distribution associated with ambient light; and a transparent display including: a display panel associated with a second spectral power distribution, the display panel configured to generate display light, and an optical stack configured to present the display light while allowing passthrough of a portion of the ambient light, the optical stack including a configurable color filter that filters the portion of the ambient light to change the first spectral power distribution based on the second spectral power distribution.

Example 2: The system of any of the preceding examples, further comprising a processor configured to generate an electrical signal based on the first spectral power distribution and the second spectral power distribution; wherein the configurable color filter includes an electrochromic material configured to filter the portion of the ambient light based on the electrical signal.

Example 3: The system of any of the preceding examples, wherein the configurable color filter filters the portion of the ambient light to transform the first spectral power distribution of the portion of the ambient light to resemble the second spectral power distribution of the display panel.

Example 4: The system of any of the preceding examples, further comprising a light sensor configured to differentiate spectral properties in different parts of the portion of the ambient light passing through the optical stack; wherein the configurable color filter filters the different parts of the portion of the ambient light differently in accordance with the differentiated spectral properties.

Example 5: The system of any of the preceding examples, wherein: the optical stack further comprises an optical combiner configured to combine the display light and the portion of the ambient light; and the optical combiner and the configurable color filter are positioned within the optical stack such that the portion of the ambient light is filtered by the configurable color filter without the display light also being filtered by the configurable color filter.

Example 6: The system of any of the preceding examples, wherein the transparent display is configured to cause the configurable color filter to change the first spectral power distribution of the portion of the ambient light without causing the display panel to change the second spectral power distribution of the display panel.

Example 7: The system of any of the preceding examples, wherein the optical stack further includes a luminance filter that filters the portion of the ambient light to change a luminance of the portion of the ambient light.

Example 8: The system of any of the preceding examples, wherein the display panel of the transparent display is a micro-light-emitting-diode (micro-LED) panel and the second spectral power distribution of the micro-LED panel is skewed away from a red portion of a color spectrum toward at least one of a green portion of the color spectrum and a blue portion of the color spectrum.

Example 9: The system of any of the preceding examples, wherein the second spectral power distribution of the display panel is associated with an average daylight (D65) illuminant and the first spectral power distribution is detected to be offset from the second spectral power distribution.

Example 10: The system of any of the preceding examples, wherein the second spectral power distribution of the display panel is associated with an incandescent lighting (A) illuminant or a fluorescent lighting (F) illuminant and the first spectral power distribution is detected to be offset from the second spectral power distribution.

Example 11: The system of any of the preceding examples, wherein the transparent display is incorporated within an augmented reality glasses device.

Example 12: A method comprising: detecting a first spectral power distribution associated with ambient light of a scene in which a transparent display is located, the transparent display including a display panel associated with a second spectral power distribution and an optical stack that allows passthrough of a portion of the ambient light; generating, by the display panel, display light for presentation by the optical stack while allowing the passthrough of the portion of the ambient light; and filtering, by a configurable color filter included within the optical stack, the portion of the ambient light passing through the optical stack to change the first spectral power distribution of the portion of the ambient light based on the second spectral power distribution of the display panel.

Example 13: The method of any of the preceding examples, further comprising: detecting a change in the first spectral power distribution associated with the ambient light of the scene; and changing, in response to the detecting the change in the first spectral power distribution associated with the ambient light of the scene, the filtering of the portion of the ambient light passing through the optical stack.

Example 14: The method of any of the preceding examples, further comprising generating an electrical signal based on the first spectral power distribution and the second spectral power distribution; wherein the configurable color filter includes an electrochromic material configured to perform the filtering of the portion of the ambient light based on the electrical signal.

Example 15: The method of any of the preceding examples, wherein the configurable color filter filters the portion of the ambient light to transform the first spectral power distribution of the portion of the ambient light to resemble the second spectral power distribution of the display panel.

Example 16: The method of any of the preceding examples, wherein the transparent display is configured to cause the configurable color filter to change the first spectral power distribution of the portion of the ambient light without causing the display panel to change the second spectral power distribution of the display panel.

Example 17: A non-transitory computer-readable medium storing instructions that, when executed, cause a processor of a transparent display to perform a process comprising: receiving, from an ambient light sensor, data indicating a first spectral power distribution associated with ambient light of a scene in which the transparent display is located, the transparent display including a display panel associated with a second spectral power distribution and an optical stack that allows passthrough of a portion of the ambient light; causing the display panel to generate display light for presentation by the optical stack while allowing the passthrough of the portion of the ambient light; and generating, based on the data indicating the first spectral power distribution and data indicating the second spectral power distribution, an electrical signal configured to cause a configurable color filter included within the optical stack to filter the portion of the ambient light passing through the optical stack.

Example 18: The non-transitory computer-readable medium of any of the preceding examples, wherein the process further comprises: receiving, from the ambient light sensor, additional data indicating a change in the first spectral power distribution associated with the ambient light of the scene; and changing the electrical signal based on the additional data.

Example 19: The non-transitory computer-readable medium of any of the preceding examples, wherein the configurable color filter includes an electrochromic material configured to perform the filtering of the portion of the ambient light based on the electrical signal.

Example 20: The non-transitory computer-readable medium of any of the preceding examples, wherein the configurable color filter filters the portion of the ambient light to transform the first spectral power distribution of the portion of the ambient light to resemble the second spectral power distribution of the display panel.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the description and claims. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Specific structural and functional details disclosed herein are merely representative for purposes of describing example implementations. Example implementations, however, may be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

The terminology used herein is for the purpose of describing particular implementations only and is not intended to be limiting of the implementations. As used herein, the singular forms “a,” “an,” and “the” are intended to include the plural forms as well, unless the context clearly indicates otherwise. It will be further understood that the terms “comprises,” “comprising,” “includes,” and/or “including,” when used in this specification, specify the presence of the stated features, steps, operations, elements, and/or components, but do not preclude the presence or addition of one or more other features, steps, operations, elements, components, and/or groups thereof.

It will be understood that when an element is referred to as being “coupled,” “connected,” or “responsive” to, or “on,” another element, it can be directly coupled, connected, or responsive to, or on, the other element, or intervening elements may also be present. In contrast, when an element is referred to as being “directly coupled,” “directly connected,” or “directly responsive” to, or “directly on,” another element, there are no intervening elements present. As used herein the term “and/or” includes any and all combinations of one or more of the associated listed items.

Spatially relative terms, such as “beneath,” “below,” “lower,” “above,” “upper,” and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the term “below” can encompass both an orientation of above and below. The device may be otherwise oriented (rotated 130 degrees or at other orientations) and the spatially relative descriptors used herein may be interpreted accordingly.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized, or location information may be obtained (such as to a city, zip code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A system comprising:

an ambient light sensor configured to detect a first white point associated with ambient light, the first white point being within a color space; and a transparent display including:

a display panel associated with a second white point within the color space, the display panel configured to generate display light, and an optical stack configured to present the display light while allowing passthrough of a portion of the ambient light, the optical stack including a configurable color filter that filters the portion of the ambient light to a third white point, the third white point being closer within the color space to the second white point than to the first white point.

2. The system of claim 1, further comprising a processor configured to generate an electrical signal based on the first white point and the second white point;

wherein the configurable color filter includes an electrochromic material configured to filter the portion of the ambient light based on the electrical signal.

3. The system of claim 1, further comprising a light sensor configured to differentiate spectral properties in different parts of the portion of the ambient light passing through the optical stack;

wherein the configurable color filter filters the different parts of the portion of the ambient light differently in accordance with the differentiated spectral properties.

4. The system of claim 1, wherein:

the optical stack further comprises an optical combiner configured to combine the display light and the portion of the ambient light; and the optical combiner and the configurable color filter are positioned within the optical stack such that the portion of the ambient light is filtered by the configurable color filter without the display light also being filtered by the configurable color filter.

5. The system of claim 1, wherein the transparent display is configured to cause the configurable color filter to change the first white point of the portion of the ambient light without causing the display panel to change the second white point of the display panel.

6. The system of claim 1, wherein the optical stack further includes a luminance filter that filters the portion of the ambient light to change a luminance of the portion of the ambient light.

7. The system of claim 1, wherein the display panel of the transparent display is a micro-light-emitting-diode (micro-LED) panel and the second white point of the micro-LED panel is skewed away from a red portion of a color spectrum toward at least one of a green portion of the color spectrum and a blue portion of the color spectrum.

8. The system of claim 1, wherein the second white point of the display panel is associated with an average daylight (D65) illuminant and the first white point is detected to be offset from the second white point.

9. The system of claim 1, wherein the second white point of the display panel is associated with an incandescent lighting (A) illuminant or a fluorescent lighting (F) illuminant and the first white point is detected to be offset from the second white point.

10. The system of claim 1, wherein the transparent display is incorporated within an augmented reality glasses device.

11. A method comprising:

detecting a first white point associated with ambient light of a scene in which a transparent display is located, the transparent display including a display panel associated with a second white point and an optical stack that allows passthrough of a portion of the ambient light, the first white point and the second white point both being within a color space;

generating, by the display panel, display light for presentation by the optical stack while allowing the passthrough of the portion of the ambient light; and filtering, by a configurable color filter included within the optical stack, the portion of the ambient light passing through the optical stack to a third white point, the third white point being closer within the color space to the second white point than to the first white point.

12. The method of claim 11, further comprising:

detecting a change in the first white point associated with the ambient light of the scene; and changing, in response to the detecting the change in the first white point associated with the ambient light of the scene, the filtering of the portion of the ambient light passing through the optical stack.

13. The method of claim 11, further comprising generating an electrical signal based on the first white point and the second white point;

wherein the configurable color filter includes an electrochromic material configured to perform the filtering of the portion of the ambient light based on the electrical signal.

14. The method of claim 11, wherein the transparent display is configured to cause the configurable color filter to change the first white point of the portion of the ambient light without causing the display panel to change the second white point of the display panel.

15. A non-transitory computer-readable medium storing instructions that, when executed, cause a processor of a transparent display to perform a process comprising:

receiving, from an ambient light sensor, data indicating a first white point associated with ambient light of a scene in which the transparent display is located, the transparent display including a display panel associated with a second white point and an optical stack that allows passthrough of a portion of the ambient light, the first white point and the second white point both being within a color space;

causing the display panel to generate display light for presentation by the optical stack while allowing the passthrough of the portion of the ambient light; and generating, based on the data indicating the first white point and data indicating the second white point, an electrical signal configured to cause a configurable color filter included within the optical stack to filter the portion of the ambient light passing through the optical stack to a third white point that is closer within the color space to the second white point than to the first white point.

16. The non-transitory computer-readable medium of claim 15, wherein the process further comprises:

receiving, from the ambient light sensor, additional data indicating a change in the first white point associated with the ambient light of the scene; and changing the electrical signal based on the additional data.

17. The non-transitory computer-readable medium of claim 15, wherein the configurable color filter includes an electrochromic material configured to perform the filtering of the portion of the ambient light based on the electrical signal.

18. The system of claim 1, further comprising a processor configured to:

detect a change in the first white point associated with the ambient light; and change, in response to the detecting the change in the first white point associated with the ambient light, the filtering of the portion of the ambient light passing through the optical stack.

19. The method of claim 11, wherein the second white point of the display panel is associated with an average daylight (D65) illuminant and the first white point is detected to be offset from the second white point.

20. The method of claim 11, further comprising filtering, by a luminance filter further included in the optical stack, the portion of the ambient light to change a luminance of the portion of the ambient light.

* * * * *